US009010072B2

(12) United States Patent
May et al.

(10) Patent No.: US 9,010,072 B2
(45) Date of Patent: Apr. 21, 2015

(54) MULTIPLE STATION AUTOMATED BAGGER SYSTEMS, ASSOCIATED DEVICES AND RELATED METHODS

(75) Inventors: Dennis J. May, Pittsboro, NC (US); Samuel D. Griggs, Raleigh, NC (US)

(73) Assignee: Tipper Tie, Inc., Apex, NC (US)

( * ) Notice: Subject to any disclaimer, the term of this patent is extended or adjusted under 35 U.S.C. 154(b) by 1000 days.

(21) Appl. No.: 13/071,831

(22) Filed: Mar. 25, 2011

(65) Prior Publication Data

US 2011/0232238 A1    Sep. 29, 2011

Related U.S. Application Data

(60) Provisional application No. 61/317,951, filed on Mar. 26, 2010.

(51) Int. Cl.
| | |
|---|---|
| *B65B 51/04* | (2006.01) |
| *B65B 5/00* | (2006.01) |
| *B65B 5/04* | (2006.01) |
| *A22C 21/00* | (2006.01) |
| *B65B 25/06* | (2006.01) |
| *B65B 43/50* | (2006.01) |

(52) U.S. Cl.
CPC ............... *B65B 5/045* (2013.01); *A22C 21/00* (2013.01); *B65B 25/064* (2013.01); *B65B 43/50* (2013.01)

(58) Field of Classification Search
CPC ........ B65B 5/045; B65B 25/064; B65B 43/50
USPC .......... 53/467, 468, 469, 473, 483, 235, 240, 53/244, 249, 250, 251, 253, 138.2–138.4, 53/284.7
See application file for complete search history.

(56) References Cited

U.S. PATENT DOCUMENTS

| | | | | |
|---|---|---|---|---|
| 3,269,083 | A | * | 8/1966 | Marano ........................... 53/535 |
| 3,789,575 | A | * | 2/1974 | Bross .............................. 53/534 |
| 4,033,088 | A | * | 7/1977 | Markert .......................... 53/473 |
| 4,270,336 | A |   | 6/1981 | Altenpohl et al. |
| 4,510,733 | A |   | 4/1985 | Hansen et al. |
| 4,580,393 | A | * | 4/1986 | Furukawa ....................... 53/512 |
| 4,648,236 | A | * | 3/1987 | Knecht ........................... 53/234 |
| 4,821,485 | A |   | 4/1989 | Evans et al. |
| 4,835,939 | A | * | 6/1989 | Thomas et al. ................. 53/248 |
| 4,947,617 | A | * | 8/1990 | Focke et al. .................... 53/234 |
| 5,014,501 | A | * | 5/1991 | Constantin et al. ............. 53/173 |

(Continued)

FOREIGN PATENT DOCUMENTS

KR        20-0341708        2/2004

OTHER PUBLICATIONS

Packaging Solutions, poly-clip® system. Multiple product brochure, 4 pages, date unknown but assumed to be prior to Mar. 26, 2010.

(Continued)

*Primary Examiner* — Stephen F Gerrity
*Assistant Examiner* — Eyamindae Jallow
(74) *Attorney, Agent, or Firm* — Myers Bigel Sibley & Sajovec, P.A.

(57) ABSTRACT

Automated (poultry) bagging packaging systems include a plurality of spaced apart holding stations that are configured to rotate in concert about a defined endless travel path to automatically serially position a respective holding station to be in communication with each of a plurality of different workstations.

31 Claims, 35 Drawing Sheets

(56) References Cited

U.S. PATENT DOCUMENTS

| | | | |
|---|---|---|---|
| 5,020,298 A | 6/1991 | Evans et al. | |
| 5,249,409 A * | 10/1993 | Jensen | 53/459 |
| 5,259,168 A | 11/1993 | Evans et al. | |
| 5,331,792 A * | 7/1994 | Kitchen | 53/502 |
| 5,335,480 A * | 8/1994 | Zaeske et al. | 53/431 |
| 5,435,114 A * | 7/1995 | Moehlenbrock et al. | 53/434 |
| 5,463,844 A * | 11/1995 | Moehlenbrock et al. | 53/436 |
| 5,471,815 A | 12/1995 | Evans et al. | |
| 5,517,798 A * | 5/1996 | Klopfenstein | 53/249 |
| 5,555,709 A * | 9/1996 | Savigny et al. | 53/570 |
| 5,644,896 A | 7/1997 | Evans et al. | |
| 5,661,954 A * | 9/1997 | Ivanov et al. | 53/430 |
| 5,749,453 A * | 5/1998 | Doornekamp et al. | 198/400 |
| 5,782,056 A * | 7/1998 | May et al. | 53/138.4 |
| 6,014,851 A * | 1/2000 | Daniele et al. | 53/430 |
| 6,705,062 B1 * | 3/2004 | Varlet | 53/510 |
| 6,705,813 B2 | 3/2004 | Schwab | |
| 6,895,726 B2 * | 5/2005 | Pinto et al. | 53/384.1 |
| 7,178,310 B2 * | 2/2007 | Veselovsky et al. | 53/384.1 |
| 8,096,097 B2 * | 1/2012 | Haschke | 53/413 |
| 2003/0101686 A1 * | 6/2003 | Savigny et al. | 53/253 |
| 2004/0068964 A1 | 4/2004 | Kirk et al. | |
| 2004/0088953 A1 * | 5/2004 | Wilson et al. | 53/573 |
| 2004/0250512 A1 * | 12/2004 | May et al. | 53/413 |
| 2006/0021292 A1 * | 2/2006 | Norton et al. | 53/138.2 |
| 2006/0042185 A1 * | 3/2006 | May et al. | 53/138.4 |
| 2008/0313999 A1 * | 12/2008 | Griggs et al. | 53/469 |
| 2009/0158688 A1 | 6/2009 | May et al. | |
| 2011/0113726 A1 * | 5/2011 | Pagani | 53/235 |
| 2011/0174870 A1 * | 7/2011 | Owensby et al. | 229/117.12 |
| 2013/0247511 A1 * | 9/2013 | Haschke et al. | 53/235 |
| 2013/0247512 A1 * | 9/2013 | Haschke | 53/235 |
| 2013/0255199 A1 * | 10/2013 | Haschke | 53/473 |

OTHER PUBLICATIONS

International Search Report and written opinion for corresponding PCT application No. PCT/US2011/029937, date of mailing Mar. 2, 2012.

* cited by examiner

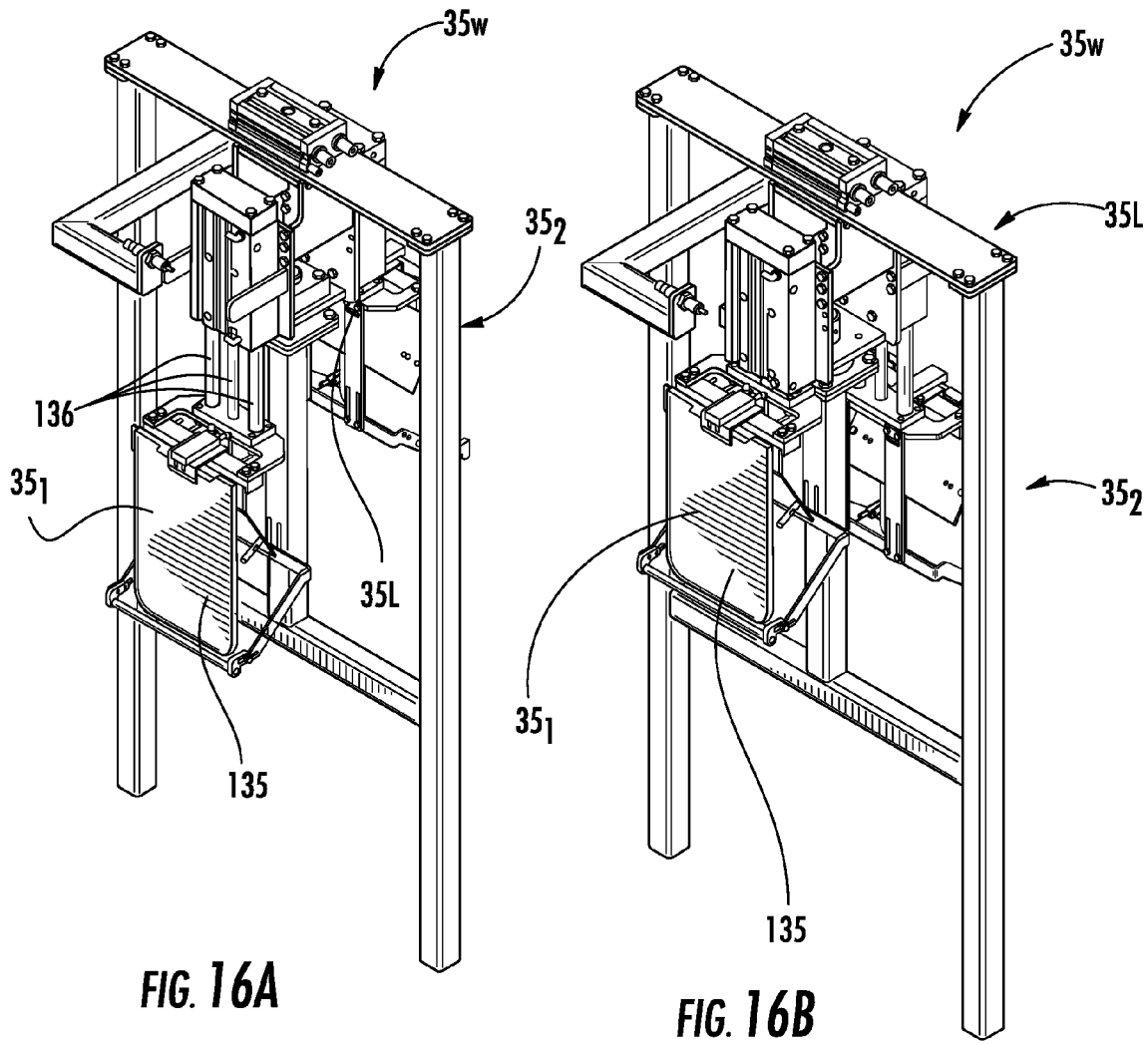
FIG. 16A
FIG. 16B
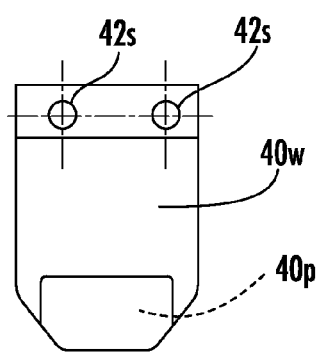
FIG. 16C
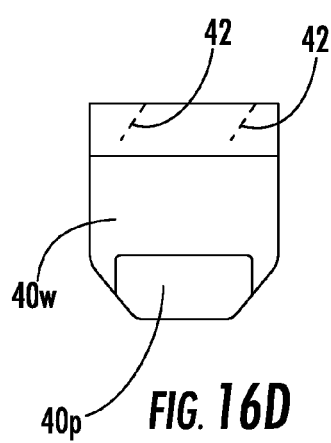
FIG. 16D

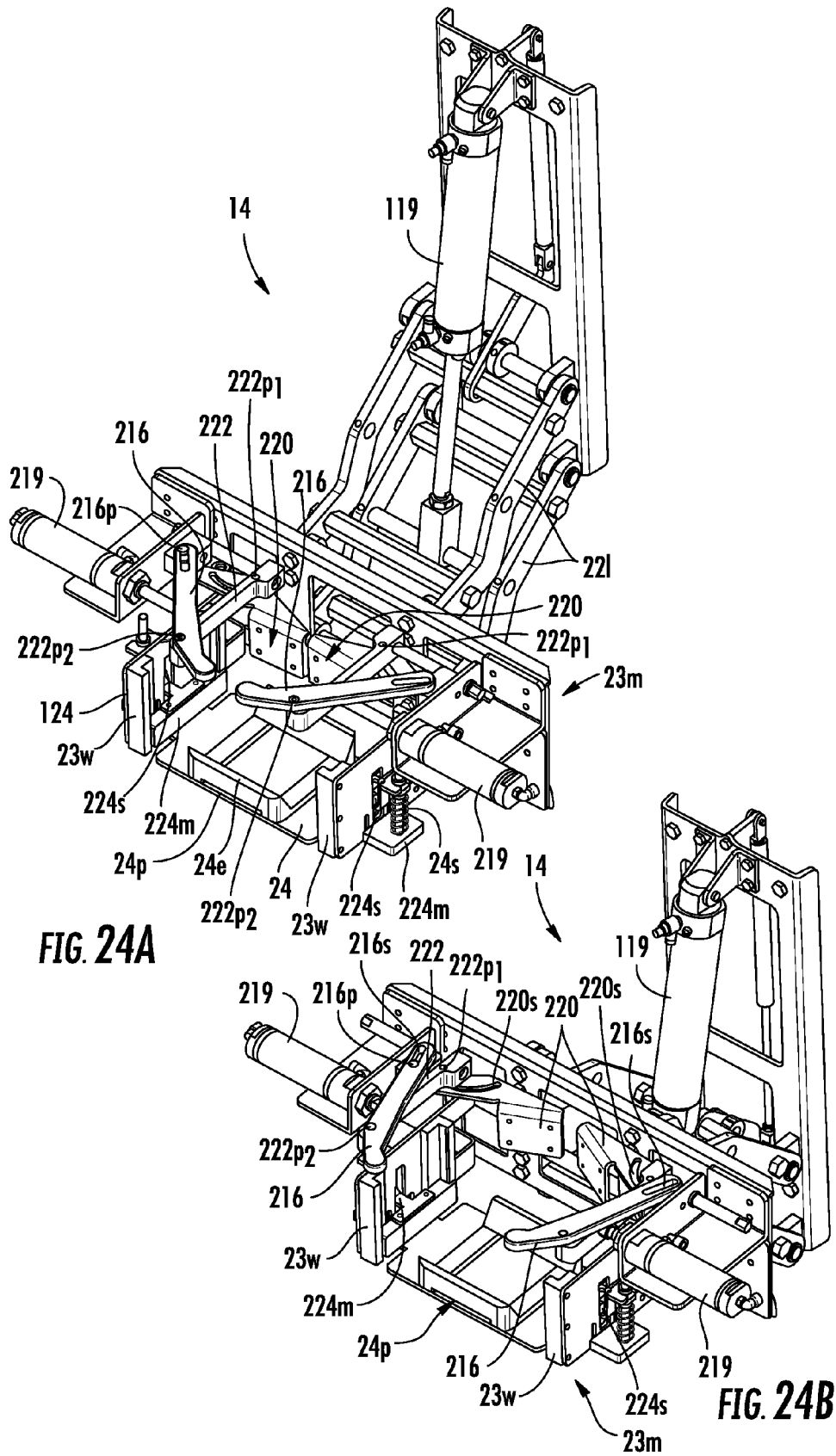

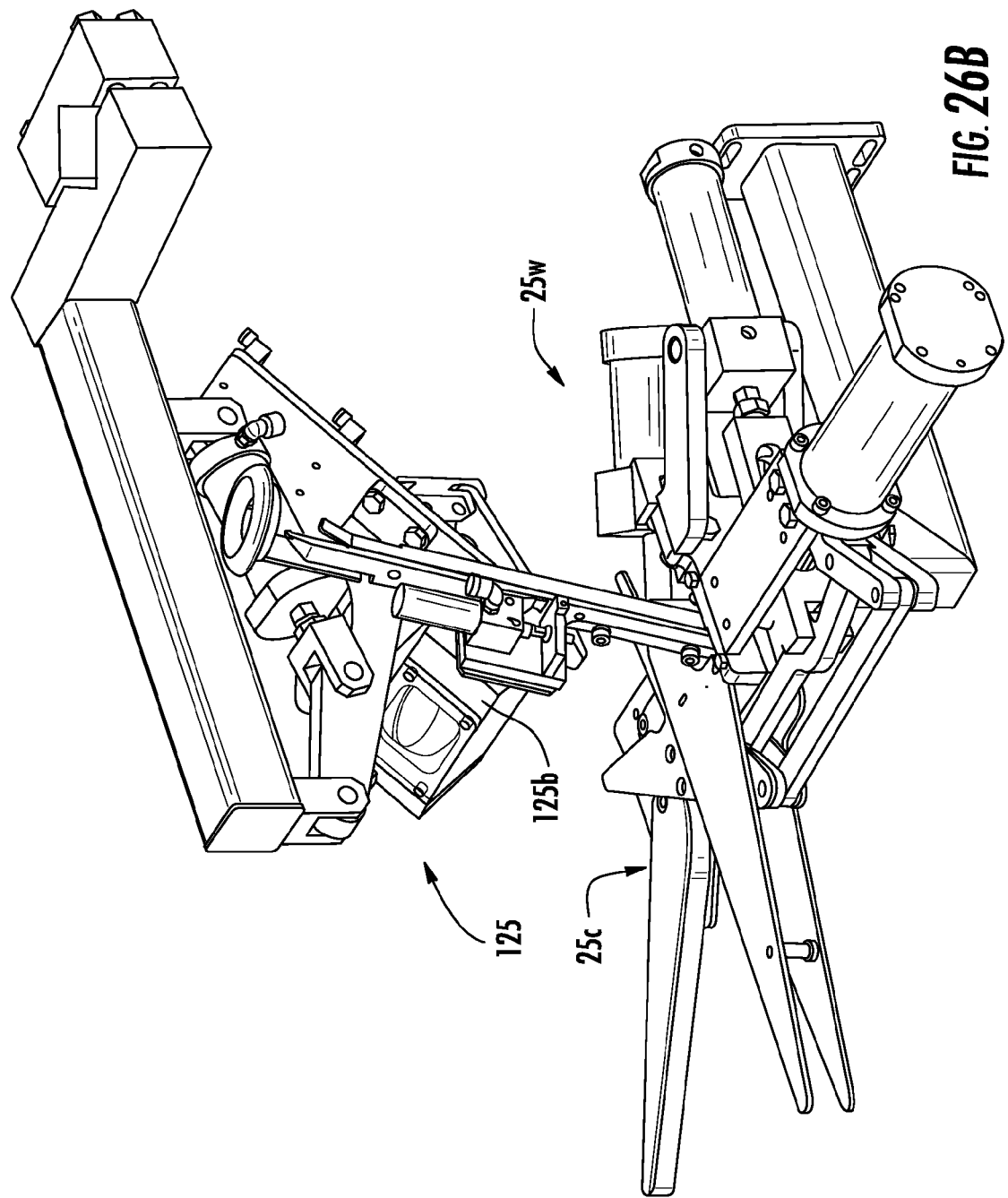

US 9,010,072 B2

MULTIPLE STATION AUTOMATED BAGGER SYSTEMS, ASSOCIATED DEVICES AND RELATED METHODS

RELATED APPLICATIONS

This application claims the benefit of and priority to U.S. Provisional Application Ser. No. 61/317,951, filed Mar. 26, 2010, the contents of which are hereby incorporated by reference as if recited in full herein.

FIELD OF THE INVENTION

The present invention relates to packaging systems for packaging products, typically poultry products, using clips.

BACKGROUND OF THE INVENTION

Known whole bird poultry packaging systems include those described in U.S. Pat. No. 5,782,056 to May et al.

SUMMARY OF EMBODIMENTS OF THE INVENTION

Embodiments of the invention are directed to automated meat, typically poultry (e.g., whole-bird), packaging systems. The packaging systems include a plurality of spaced apart holding stations that are spaced apart about a defined endless travel path (typically a substantially circular path) and cooperate with a plurality of spaced apart cooperating workstations positioned along the travel path to automatically package the product (e.g., bagged poultry). The workstations and/or the holding stations travel about the endless path to package the poultry. In some embodiments, the holding stations travel substantially in concert about the travel path to serially communicate with the workstations.

The plurality of stations can be between about 4-12 stations (typically 5 or 8) that travel in concert about the travel path and can be held by a platform with at least one, typically a central, upstanding column. The travel path can be substantially circular such that the holding stations rotate about a substantially circular travel path about the centerline of the column.

At least some, typically all, of the workstations can reside proximate an outer perimeter of the travel path and extend mechanisms that contact the product holder and/or bags thereon to carry out defined operations. The workstations may include a poultry loading station, a hocking station, a clipper station and a bag loading station. The packaging system can include a drive system that can cause the product (e.g., poultry) holders to travel downward a distance between the hocking and clipper workstations, remain at that level through the bag loading workstation, then automatically rise between the bag loading workstation and the poultry loading workstation.

Embodiments of the invention are directed to automated (poultry) bagging packaging systems that include a platform and a plurality of spaced apart poultry holding stations mounted to the platform. At least one of the platform or the poultry holding stations rotates about a defined endless travel path to automatically serially position a respective holding station to be in communication with each of a plurality of different workstations.

Other embodiments are directed to methods of packaging whole bird (meat objects) that include: (a) placing a whole bird into an open bag; (b) automatically rotating the bird in the open bag to a first hocking workstation; (c) automatically hocking the bird in the open bag; (d) automatically clamping the hocked bird to retain the legs in a desired orientation; (e) automatically rotating the hocked bird in the open bag to a second clipping workstation while translating the hocked, clamped bird a distance downward; and (f) automatically applying at least one clip to a gathered end portion of the bag with the hocked bird in the bag.

The placing step can be carried out automatically by mechanically transferring a respective whole bird from a suspended shackle aligned with an open bag held by a poultry holder under the aligned suspended shackle. The method can be carried out using a frame holding a plurality of circumferentially spaced apart poultry holders that rotate through a circular travel path that places a respective poultry holder in communication with the hocking workstation, then the clipper workstation.

The method may include stopping the whole bird in the package for a defined time at the first hocking workstation before rotating the hocked bird in the bag to the second clipping workstation, and stopping the hocked whole bird in the package at the clipping workstation for the same defined time before rotating a respective clipped package to a discharge location.

Yet other embodiments are directed to methods of packaging poultry that include: (a) providing a plurality of spaced apart poultry holders that travel about a closed loop travel path; (b) translating the poultry holders in concert so that each respective poultry holder automatically serially travels through a plurality of defined spaced apart workstations residing proximate a perimeter of the travel path, including a loading workstation and a clipping workstation; then (c) successively automatically providing a packaged whole bird in a clipped bag in response to the translating step.

The methods may include, at the clipping workstation, automatically applying at least one clip to a gathered tail portion of a bag holding poultry therein at the clipping workstation, automatically cutting a tail end off the clipped bag at the clipping workstation and automatically collecting the cut tail end for disposal.

Yet other embodiments are directed to automated product bagging systems that include: (a) a plurality of spaced apart product holder stations that travel in concert about a defined continuous travel path; and (b) a plurality of spaced apart automated workstations positioned along the travel path that cooperate with the product holder stations to automatically package the product. One of the automated workstations is a clipping workstation that applies at least one clip to a gathered tail portion of a covering holding a respective product.

The plurality of stations is typically between about 4-12 stations.

The bagging system may also include a mounting platform with a central upstanding column that holds each of the product holder stations. The travel path can be substantially circular such that the product holders rotate about an axially extending centerline of the column.

The bagging system product holder stations can be whole-bird holder stations and the workstations all reside proximate an outer perimeter of the travel path.

The bagging system can also include a drive system that is configured to (a) translate the product holders downward a distance of between about 6-18 inches to reside at a lower level between hocking and clipper workstations relative to a workstation upstream thereof, (b) maintain the product holders at the lower level through a bag loading workstation, then (c) automatically raise the product holders upward a distance to a product loading level between the bag loading workstation and the poultry loading workstation.

Still other embodiments are directed to a computer program product for operating a poultry bagging system with a plurality of poultry holding stations that rotate in concert about a continuous travel path that moves the product holding stations through a progression of spaced apart different workstations. The computer program product includes a computer readable storage medium having computer readable program code embodied in the medium. The computer-readable program code includes: (a) computer readable program code configured to control a travel speed of the poultry holding stations along the travel path; (b) computer readable program code configured to direct the holding stations to rotate and stop in concert so that each holding station is held for a defined time at the different workstations along the travel path; (c) computer readable program code configured to direct to the holding stations to automatically travel a distance downward as they are traveling along the travel path so that one or more holding stations are at a different vertical level relative to others at one or more positions along the travel path; and (d) computer readable program code configured to monitor sensors that determine a position of one or more of the holding stations relative to one or more workstations and directs at least one workstation to carryout defined operations when a holding station is in position thereat.

Yet other embodiments are directed to packaging systems that include: (a) a plurality of holding stations that rotate in concert about a continuous travel path whereby the product holding stations move through a progression of spaced apart different workstations; (b) a plurality of spaced apart workstations positioned along a perimeter of the travel path, at least one of the workstations being a clipping workstation with a clipper that automatically applies at least one clip to a product held in a covering by one of the holding stations; and (c) a controller configured to (i) control a travel speed of the holding stations along the travel path, (ii) direct the holding stations to rotate in concert, then stop in concert so that each holding station is held for a defined time at the different workstations along the travel path, (iii) direct at least a portion of the holding stations to automatically travel a distance downward as they are traveling along the travel path so that one or more holding stations have a portion that is at a different vertical level relative to others at one or more positions along the travel path, and (iv) monitor sensors that determine a position of one or more of the holding stations relative to one or more workstations and direct the workstations to carry out defined operations when a holding station is in position thereat.

Although described above with respect to method aspects of embodiments of the present invention, it will be understood that these features may also be embodied as systems, subsystems, modules and/or computer program products.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 16A is a side perspective view of an example of a bag station according to embodiments of the present invention.

FIG. 16B is a side perspective view of the bag station shown in FIG. 16A with actuators in a raised position according to embodiments of the present invention.

FIGS. 16C and 16D are schematic front view illustrations of bags that can be used for packaging whole-bird meat products according to embodiments of the present invention.

FIGS. 24A and 24B are side perspective views of holding stations with onboard hocking components according to embodiments of the present invention.

FIGS. 26A and 26B are side perspective views of an exemplary clipper workstation according to embodiments of the present invention.

DETAILED DESCRIPTION OF EMBODIMENTS OF THE INVENTION

Figure 1:
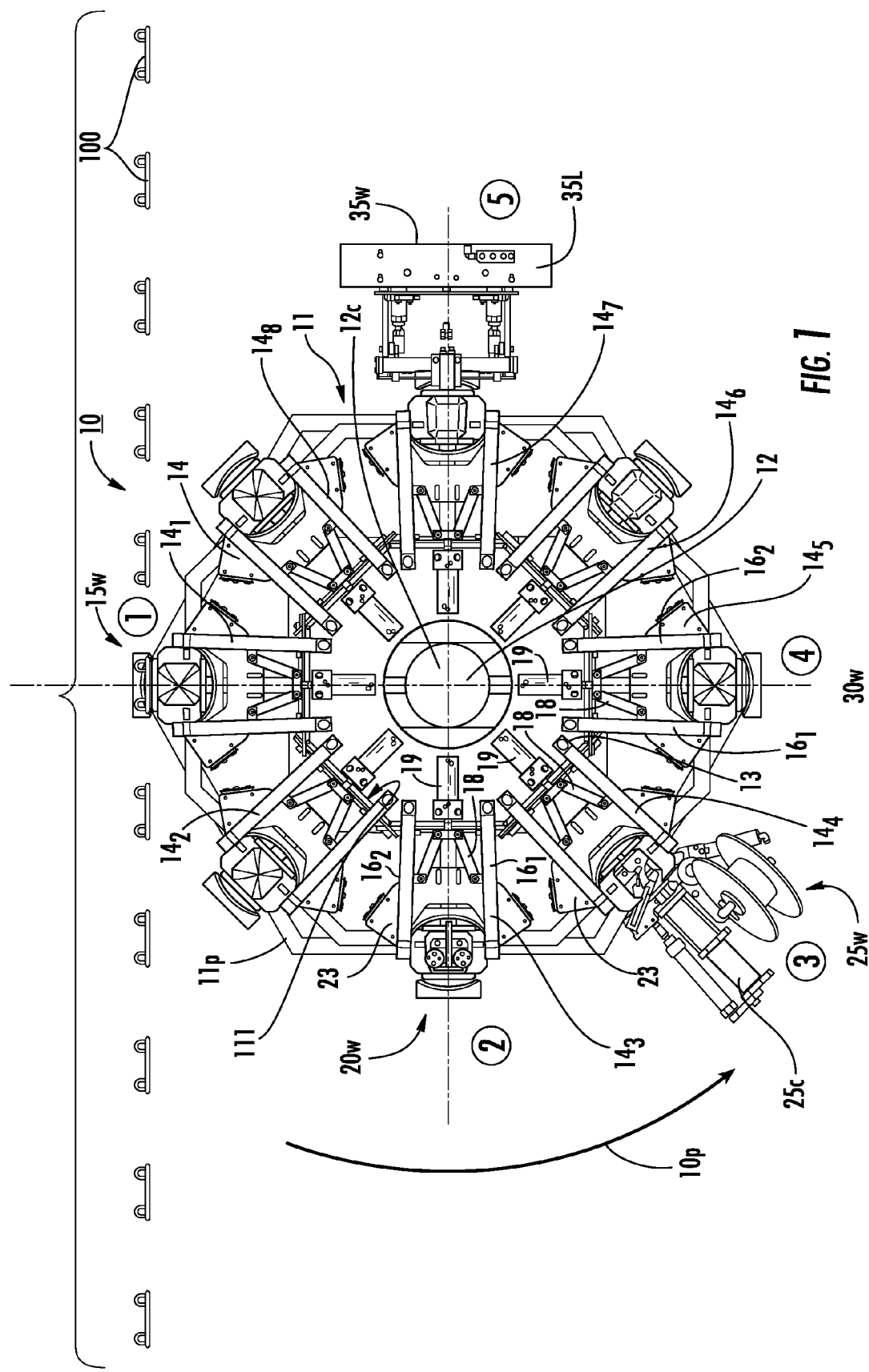
FIG. 1 is a top view of an exemplary automated packaging system according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a structure used to support one or more assemblies, modules and/or components. The frame can be floor mounted (fixed or moveable) or a wall and/or ceiling supported frame.

The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems. The term "workstation" refers to a particular machine assembly at a location that is configured to carry out a defined operation or operations or otherwise perform a certain function, e.g., "work" that is associated with packaging a product, e.g., a clipping workstation is defined to be programmatically controlled to automatically (electromechanically) apply at least one clip to a casing or covering such as to a gathered end portion of a flexible bag. Consumable items used by one or more workstations may be replaceable by an operator.

In the description of embodiments of the present invention that follows, certain terms are employed to refer to the positional relationship of certain structures relative to other structures. As used herein, the term "front" or "forward" and derivatives thereof refer to the general or primary direction that the product travels along a defined travel path to form a packaged product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

Embodiments of the present invention can be used for packaging any suitable object or objects using a clipper to apply clips to seal products held in flexible bags. The flexible bags can comprise any suitable material or combinations of materials (edible or inedible, natural or synthetic) such as, but not limited to, one or more of collagen, cellulose, elastomeric, polymeric and/or plastic casing, and netting. When used with food products, the flexible bag should be food-compatible. The objects for packaging can be solid or semi-solid objects, flowable product such as seed, granules or powder (edible or inedible), and the like, typically food objects. Embodiments of the invention are particularly useful for packaging "whole bird" food products, which as known to those of skill in the art may be interchangeably be referred to as "poultry". Embodiments of the invention may be particularly suitable for packaging whole-bird or poultry in wicked bags. In some embodiments, the poultry may have a weight of between about 2-12 lbs, typically between about 4-6 lbs, and more typically between about 4-5.5 lbs, on average. However, other size and weights may be accommodated.

The terms "continuous" and "endless" refer to a travel path with a closed perimeter, e.g., a closed loop. The continuous or endless travel path can be substantially circular, but may also have other shapes such as oval, polygonal and the like.

Referring now to the figures, FIGS. 1-4 illustrate an example of an automated packaging system 10. As shown, the system 10 includes a support frame/platform 11 and a plurality of spaced apart (poultry) holding stations 14 mounted to the platform 11. The holding stations are identified as $14_1$-$14_8$ but lesser or greater numbers of the holding stations 14 may be used. The holding stations 14 are typically equally spaced apart and travel in concert about an endless or continuous travel path 10$p$.

In operation, the holding stations 14 can travel (e.g., rotate) about the defined endless travel path 10$p$ to automatically serially position a respective holding station 14 to be in communication with each of a plurality of different workstations, shown as five different spaced apart workstations labeled as stations "1"-"5" in an exemplary order in FIG. 1 and also identified by reference numbers, 15$w$, 20$w$, 25$w$, 30$w$ and 35$w$. However, additional or lesser numbers of workstations may be used and different workstations for different operations may also be used. In addition, the different workstations can be combined into a combination workstation that performs the operations of the separate workstations. The workstations can be configured to automatically carry out defined operations associated with packaging to reduce operator labor. The holding stations 14 can rotate or travel in either direction, e.g., clockwise or counterclockwise, shown as counterclockwise in FIG. 1, but the direction of rotation may dictate the placement of the workstations so that the desired work progression is serially provided (in the desired order).

Figure 11:
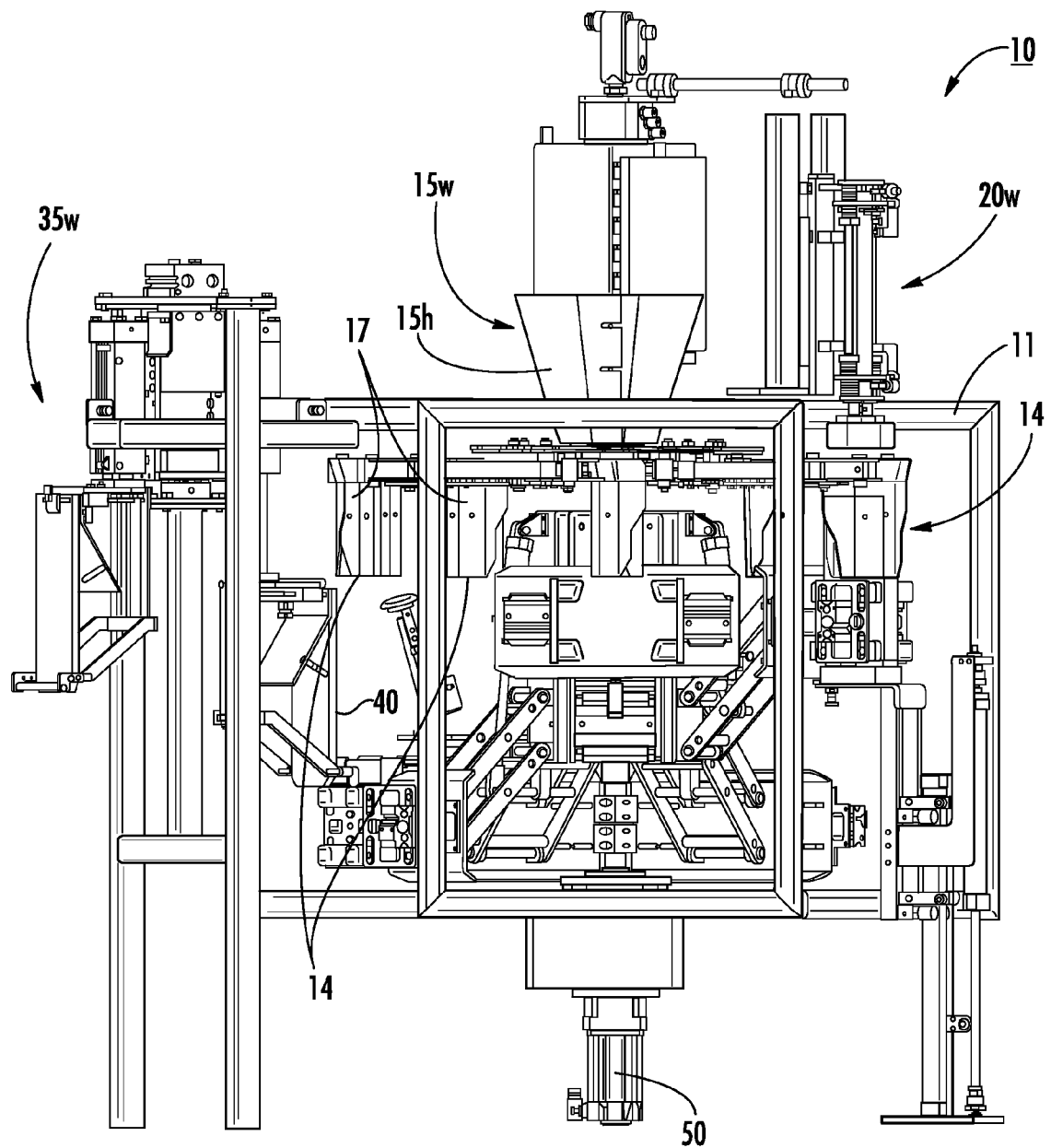
FIGS. 11-15 are different side views of the system shown in FIG. 10.
Figure 12:
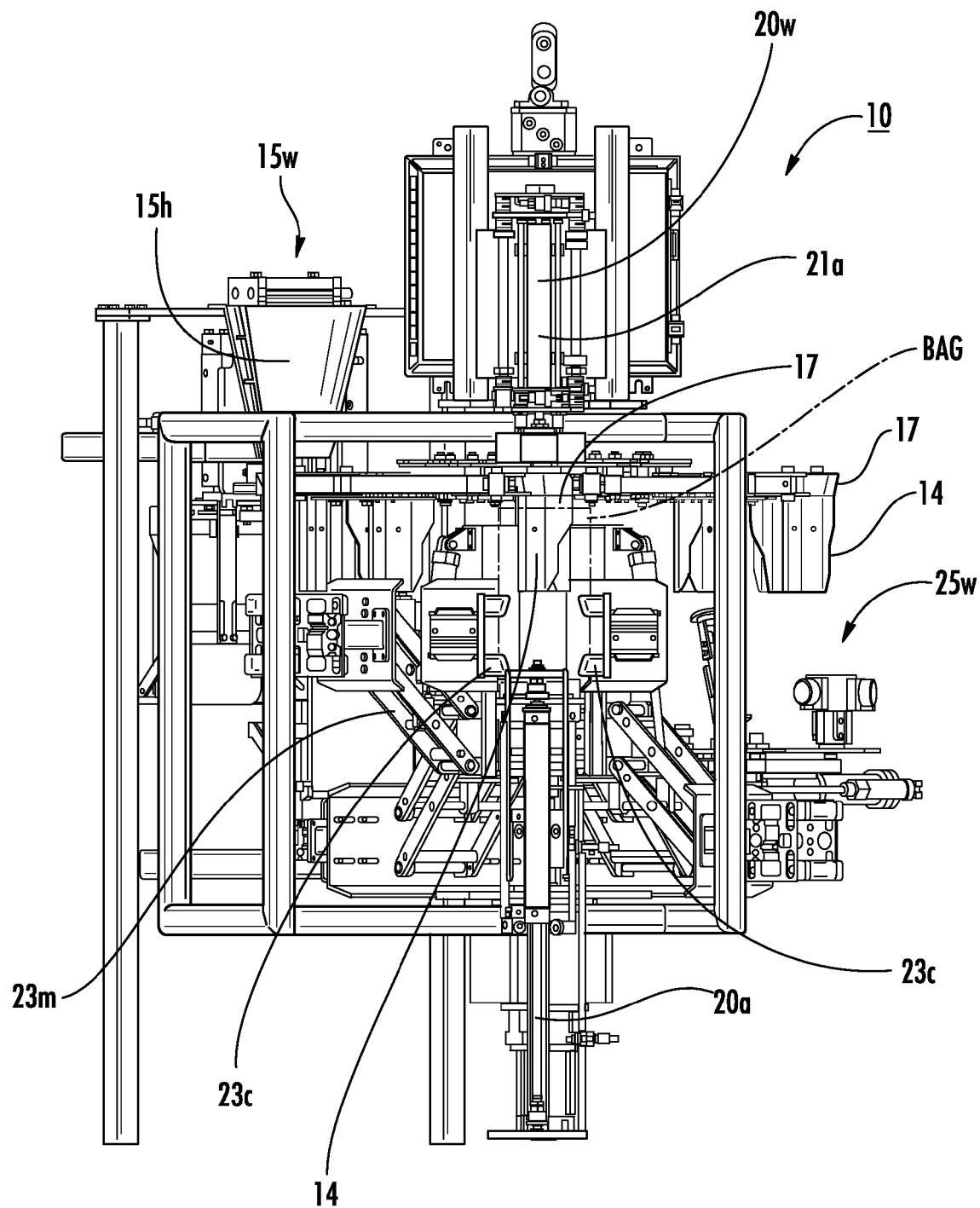

Typically, the system 10 is substantially automated and does not require a dedicated operator. A "floating" operator can be used to oversee or monitor a single system or several of these systems 10 (FIG. 11). If a "jam", misfeed or other operational error occurs, the system 10 can generate an alarm and/or cease operations (and rotation of the stations as appropriate). Typically, an operator will only be needed to load bag material (e.g., sets of pre-wicked bags) at the bag loading station 35w (where used) and reload clips at the clipping station 25w.

The first workstation 15w can be a loading/dropping station which receives the object/objects (e.g., whole bird) for packaging. For example, poultry 101 (FIG. 3) can be transported by a moving (overhead) shackle or in-line or overhead conveyor 100 (such as conventional overhead shackle systems) and placed into an open bag 40 (FIGS. 2-4) held by a respective holder 14 at this workstation 15w with the open end of the bag facing upward. The holding station placement can be automatic by synchronizing the movement of the holding stations 14 to that of the input feed system 100. For example, the holders 14 can be configured to move a defined distance, then stop at a workstation or resting location for a defined time, then move again a defined distance to stop at the next workstation, etc. (e.g., a "stop" and "go" operation). When stopped at the first workstation 15w, the holder 14 can be aligned under a shackle so that when released, the bird drops into the bag 40 held by the holder. A mechanical arm (not shown) can also be used to facilitate the transfer of the bird from the input device to the bag held by the holder 14. For an example of a mechanical grasper, see, U.S. Pat. No. 5,782,056, the contents of which are hereby incorporated by reference as if recited in full herein.

In other embodiments, a hopper 15h (FIGS. 10-15) can be aligned with the open bag at the input station 15w (station "1") to input material (whole bird, powder, gel, fluid, granules or other objects).

The second (indexed) position or workstation 2 can be a hocking (and pushing) workstation 20w. The operations can be performed while the bird is oriented or held substantially vertical in the bag 40 by the holding station 14 with the legs closer to the open (top) end of the bag. A pushing/hocking procedure can be carried out on the legs of the bird. A "hocked" bird has the thighs of its legs held in close proximity to the sides of the carcass of the chickens. The pushing/hocking workstation 20w can include a hocking apparatus that can cooperate with the holding station 14 to hock the bird in the (wicked) bag. Examples of hocking (pushing) devices are described in U.S. Pat. Nos. 5,782,056 and 7,178,310, the contents of which are hereby incorporated by reference as if recited in full herein. Further aspects of an exemplary hocking/pushing workstation 20w will be discussed below with respect to FIGS. 9 and 18A, 18B, 19A, 19B, and 23A-23D. Still further, in some embodiments, the system does not require a dedicated hocking station.

The third (indexed) position or workstation 25w can be a clipper workstation. At the clipper workstation with an automatic/semi-automatic clipper 25c, a bag tail can be automatically gathered and clipped by the clipper 25c while held in a generally or substantially upright position with the tail portion at the top. As conventional, the clipper at the clipping station can electronically operate to apply at least one clip, e.g., actuate, punch, and/or clip, and a knife can actuate/fire to cut a tail portion off the bag above the applied clip. The cut tail can be automatically captured and removed, e.g., using a vacuum take-away or other mechanism.

The fourth station and/or workstation "4" can be a discharge position/location and/or station 30w and can be in communication with a take-away conveyor, bucket or other receiver (not shown). This operation can be carried out "on the fly" while the holding station is moving downstream of the clipper to release the packaged object or as the station is halted while neighboring stations 14 reside at the clipper 25w and bagging workstations 35w and/or while one or more other neighboring stations 14 are at "rest" locations rather than active workstations. The discharge workstation 30w can be in communication with a conveyor, bucket or other receiver that automatically captures the packaged product when released from the holding station 14. The discharge position or station 30w can be merely a "release" station or position. A pusher (not shown) or extendable arms mounted to the holding stations 14 can actuate to push or place the packaged product out of the bounds (or below or within an inner space) of the system 10 and onto or into a receiver that conveys or otherwise captures and provides the (clipped) packaged product so that the affected holding station 14 is now "empty" as it approaches the bag loading station 35w.

Figure 5:
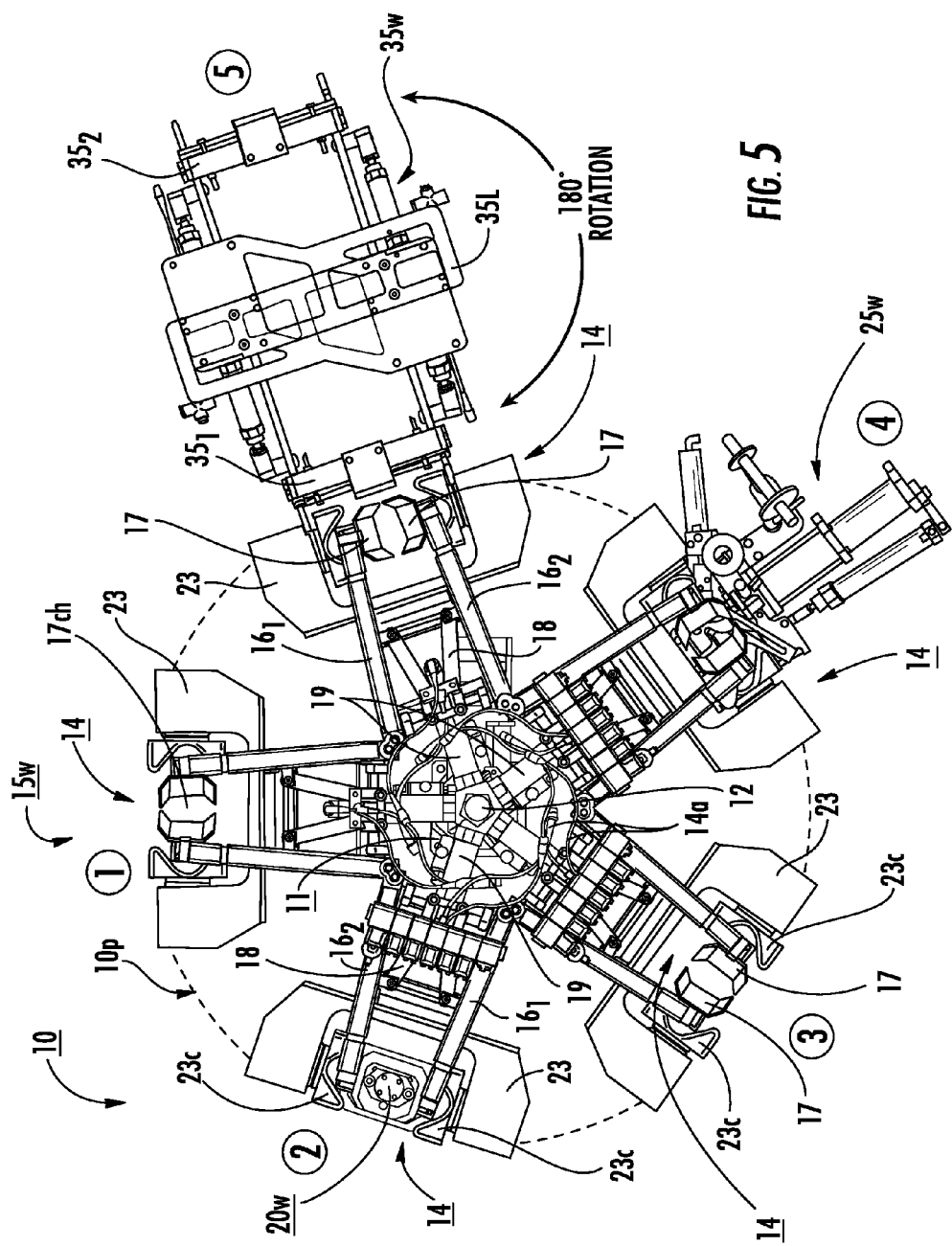
FIG. 5 is a top view of another exemplary automated packaging system according to embodiments of the present invention.

The fifth (indexed) position or workstation "5" can be bag loading station 35w. At this station a "new" bag can be loaded onto a respective holding station 14. Further details of an exemplary bag machine are discussed with respect to FIGS. 5, 10, and 16A/16B below. The bag loading station 35w can load a respective bag onto an aligned holder station 14 (while moving or stopped). The bag loading workstation 35w can be reloaded with a bag supply (e.g., typically long lengths of attached bags) by an operator while the system is operating. The bag loader 35L can have two bag-feed positions, one of which is active or operative at any one time. The bag loader 35L can rotate about 180 degrees to allow for load side to be reloaded while the other is operative to dispense bags (FIG. 5). The product holding stations 14 can automatically "reset" to the starting orientation and position between stations 5 (35w) and 1 (15w) while translating along the travel path (and/or while at either workstation 35w or 15w).

Figure 2:
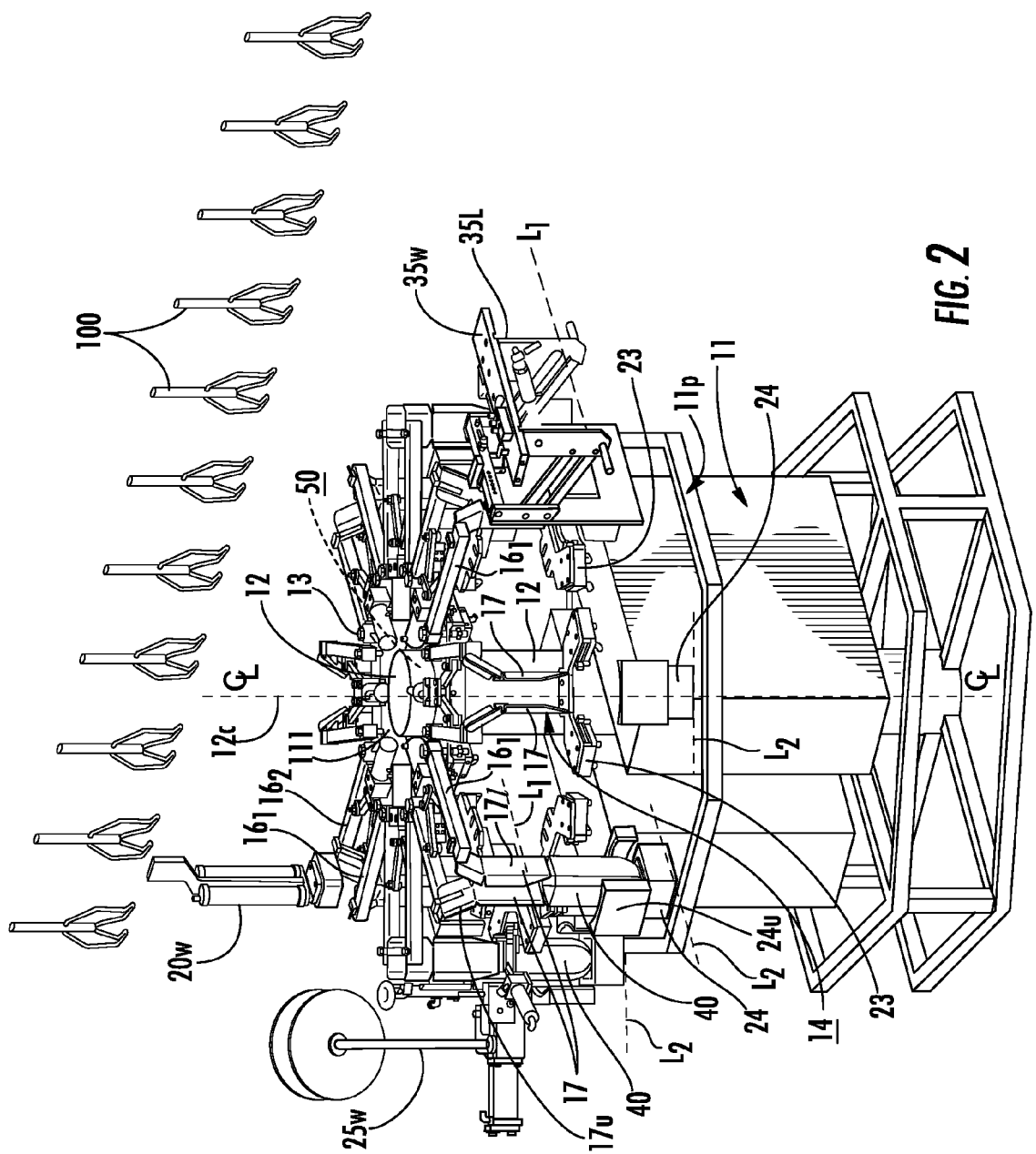
FIG. 2 is a side perspective view of the system shown in FIG. 1.
Figure 3:
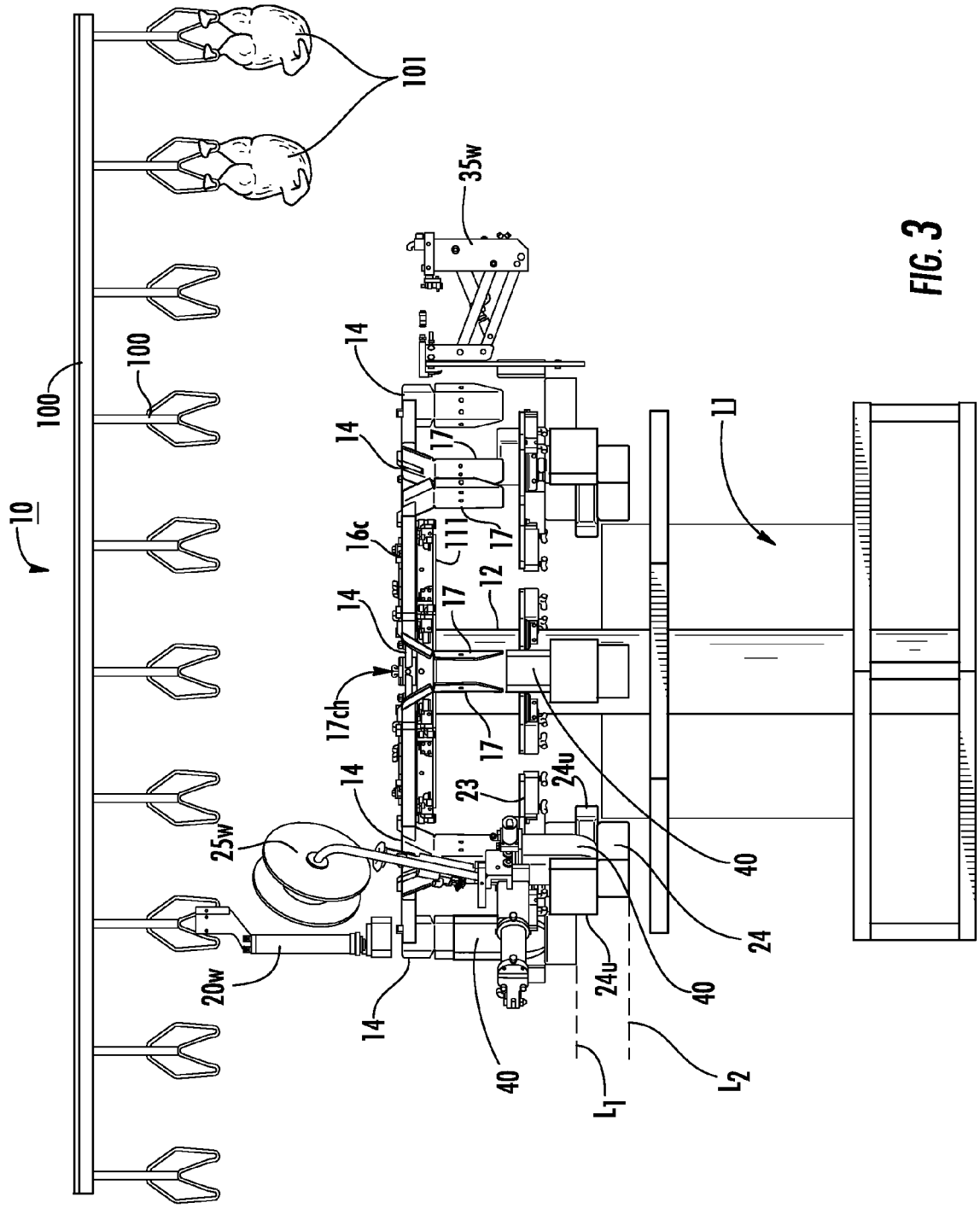
FIG. 3 is a side view of the system shown in FIG. 1.

In some embodiments, as a respective holding station 14 moves about that travel path 10p, typically between two adjacent workstations, such as between the hocking and clipper workstations 20w, 25w, at least a portion of the holding station 14 can lower or drop down a defined distance to reside at a lower level "$L_2$" as it approaches or resides in the next adjacent downstream workstation. For example, after a respective holding station stops for a defined time at the hocking workstation 20w, the holding stations 14 translate an indexed distance to place a respective holding station 14 downstream of the prior workstation, in line or queue for, or at, the next workstation 25w. While a respective holding station 14 with the hocked bird is translating between the hocking and clipping workstations, the base 24 (FIGS. 2-4) can travel downward a distance of between about 4 inches to about 2 feet, typically between about 10-12 inches. Other distances may be used or the workstation may hold the package at the same level throughout the travel path 10p.

Where used, the lowering operation can place the base 24 of the holding station 14 with the hocked bird at a lower level $L_2$ at the clipping workstation 25w relative to the higher level $L_1$ during loading and hocking (and bag reloading) (compare, for example, level one "$L_1$" with level two "$L_2$" in FIGS. 2 and 3). Similarly, after the discharge position or station 30w, the respective bases 24 of the holding stations 14 can travel back up to reside at the higher level $L_1$ while the respective holding station 14 translates (e.g., rotates) between workstations 30w and 35w. Typically, the holding stations 14 reside at the higher level $L_1$ at the (poultry) loading and hocking workstations 15w, 20w. Alternatively, the up and down translations can be performed at different workstations instead of between them. As shown, in FIG. 2, the clipper 25c at the clipping workstation is configured to apply a clip to an upper end portion of the bag 40 held on the lowered base 24 with the horn members 17 residing above the open end of the bag 40.

Figure 6:
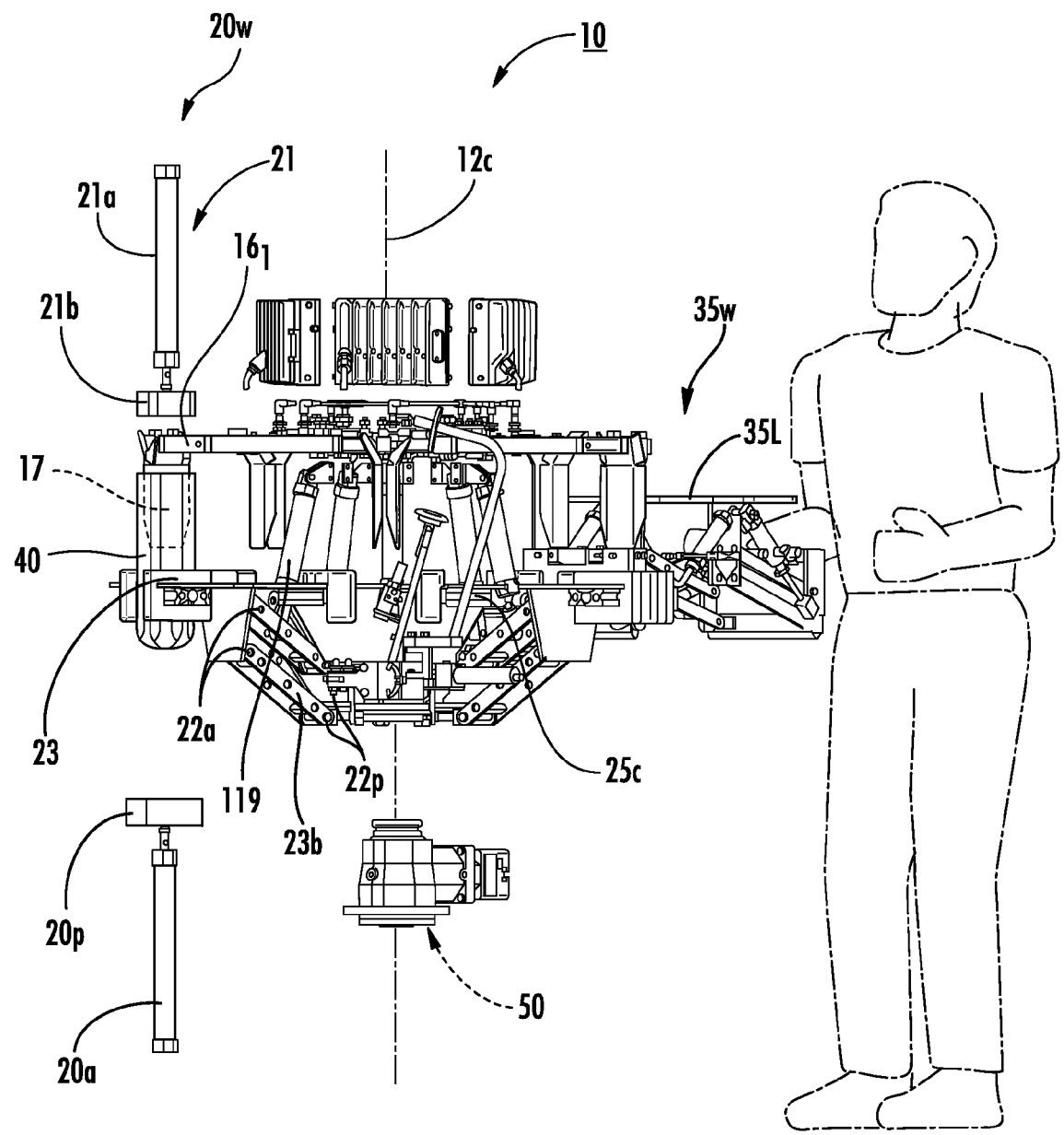
FIG. 6 is a side view of the system shown in FIG. 5 (with certain components omitted) showing a workstation at position 2.
Figure 7:
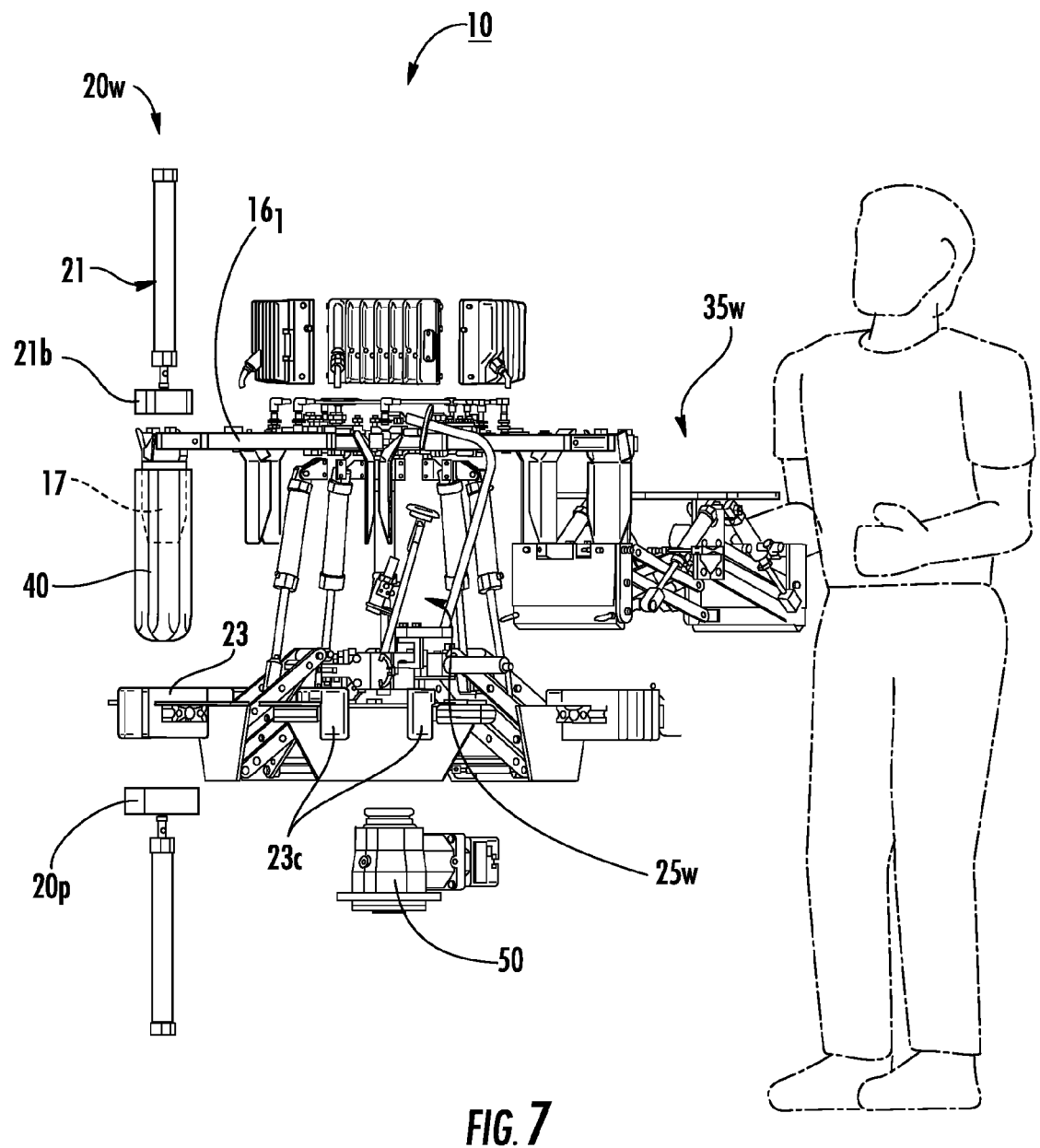
FIG. 7 is a side view of the system shown in FIG. 5, similar to that shown in FIG. 6, but illustrating a holding station at position 3 with a lower portion, e.g., base, dropped or lowered according to embodiments of the present invention.

FIGS. 5-7 illustrate another exemplary embodiment of a packaging system 10. In this embodiment, there are five (5) holding stations 14 and they are more closely spaced than the holding stations shown in FIG. 1. As shown, the travel path 10p is substantially circular. The only "blank" stop location or station is between the hocking/pushing station 20w (position 2) and the clipper station 25w (position 4). Thus, position "3" can be an inactive region or may be configured to be a "drop" zone where at least a portion of the holding station can travel down a defined distance in preparation for engaging the clipping workstation 25w.

All of the workstations 15w, 20w, 25w, 30w, 35w can be circumferentially spaced apart along the defined travel path 10p and at least some reside proximate but on the outside perimeter of the travel path 10p. Some neighboring workstations may be closer together than other neighboring workstations along the travel path 10p. In some embodiments, all the workstations can be equally spaced apart.

Referring to FIGS. 2-6, the floor-supported mounting frame or platform 11 can include a center post or column 12 and the travel path 10p can have a perimeter shape that (circumferentially) extends about a centerline 12c of the system 10. The centerline 12c can extend upwardly through the post 12. Thus, in some embodiments, the product holders 14 rotate in concert about the centerline 12c. The system 10 can be configured to operate using servo systems configured to provide control of position, velocity, and torque and monitor feedback of the motor(s). The valves and air supply can be fed through/from the center post 12 to each holding station 14. The system 10 can be configured to be almost entirely automated without requiring manual assistance (other than potentially loading bags for the bag loading station) and can package about 10-50 birds/minute or even more, typically about 30 birds/minute, on average.

The system 10 can include a main drive system 50 that rotates the column 12 and stations 14 at the desired speed (and can vary the speed and stop and go increments depending on production requirements/inputs). The drive system 50 can comprise a servo to drive the column 12. In some particular embodiments, the system 10 may optionally include a split main drive sprocket residing under the rotating column 12 surrounding the vertical column and a drive system in communication with the sprocket that rotates the rotating column at a desired speed. In some embodiments, the vertical support column 12 rotates in response to rotation of the sprocket, driven by gearboxes and servos as is known to those of skill in the art (allowing for the "indexed" or "start and stop" motion). The system 10 may also optionally include first and second vertically stacked and spaced apart plates, each of the plates being split into a plurality of adjacent pieces with a radially extending split line extending between the adjacent pieces. Where used, the stacked vertically spaced apart (support) plates can reside proximate the sprocket and may also be split plates to allow for ease of repair without requiring disassembly of the column 12 to remove the sprocket. The split line of the support plates can be aligned, as shown, or offset. The split line of the support plates may be offset with the split line of the sprocket or may be aligned (not shown). A suitable split sprocket is available from Martin Sprocket and Gears, Inc., located in Mansfield, Tex. See, co-pending, co-assigned, U.S. Patent Application Publication No. US-2009-0158688-A1 (e.g., FIG. 12 therein), for further discussion of this drive configuration.

The system 10 can include air supply lines that connect to the pneumatic actuators 19, 119 and clipper 25c. The holding station airlines 14a (FIG. 5) can travel down an outside perimeter and/or an internal channel of the column 12 to a pressurized air supply. The system 10 can include a single common main air supply that can be diverted to feed all of the actuators of the holding stations. Alternatively, each or groups of the actuators 19, 119 may have a dedicated discrete air supply. The clipper 25c can include on-board air supply conduits/lines with valves that releasably connect to an air supply. The air supply can be provided at any desired operating pressure sufficient to run the actuators (for holding stations 14 and/or clipper 25c) at a desired speed, typically at a pressure between about 80-125 psi.

As noted above, in operation, the respective holding stations 14 can be configured to stop for a defined time at a respective workstation, index a defined distance, then stop again, and repeat this "stop and go" operation to travel the entire travel path 10p to serially present different holding members 14 at each respective workstation along the path 10p. The system 10 can be configured to automatically repeatedly index a holding station 14a desired distance (or angular movement) every 1-20 seconds, typically about every 2-8 seconds, and more typically about every 3-5 seconds. Thus, at each workstation 15w-35w, a respective holding station 14 can stop for a defined amount of time, index to a next location, stop for the same amount of time (e.g., about 2-8 seconds), index to the next location, etc. to travel about the entire travel path 10p. In some embodiments, the automatic indexing can be in response to an electronic "go" direction to the drive system as determined by a servo and/or controller in response to sensors, monitors or other input parameters/signals at/from each functional workstation, e.g., a bird is loaded at position 1 (typically dropped a few inches from a shackle), the hocking is complete at position 2, the clipping is complete at position 3 and a bag is loaded at position 4 or 5 (FIGS. 5, 1, respectively). In yet other embodiments, the holding stations 14 can continuously rotate or translate (and components of the workstations may be configured to translate at a common speed for a defined distance to carry out defined operations). The system 10 can be configured to automatically package between about 10-50 birds a minute, typically about 30, although greater and lesser numbers may be possible.

In some embodiments, such as where the system 10 includes eight (8) holding stations 14 (e.g., FIG. 1) and the travel path is substantially circular, each holding station indexed translation can be between about 15-45 degrees. For five (5) holding stations 14 (e.g., FIGS. 5, 10, 23A) with a substantially circular travel path 10p, each holding station 14 can have an indexed translation of about 72 degrees.

Figure 20A:
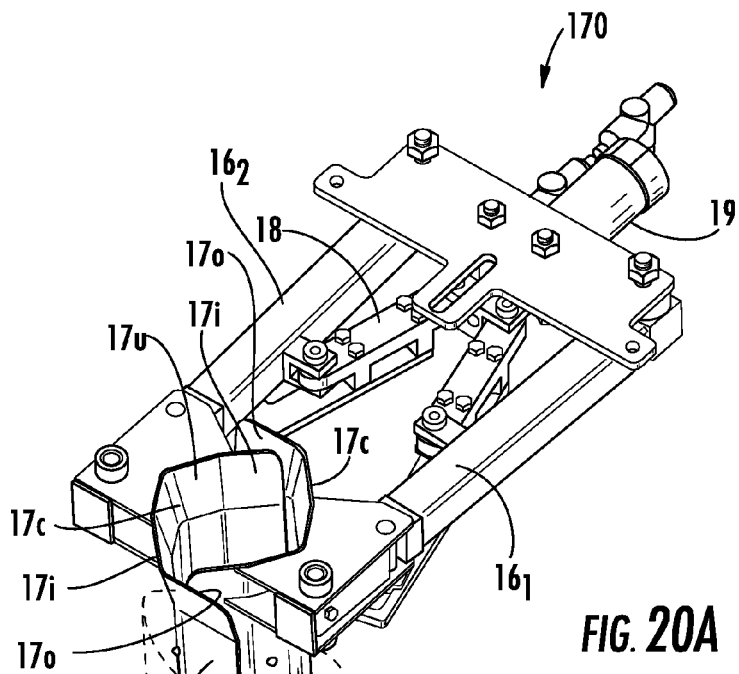
FIG. 20A is top perspective view of a horn according to embodiments of the invention.
Figure 20B:
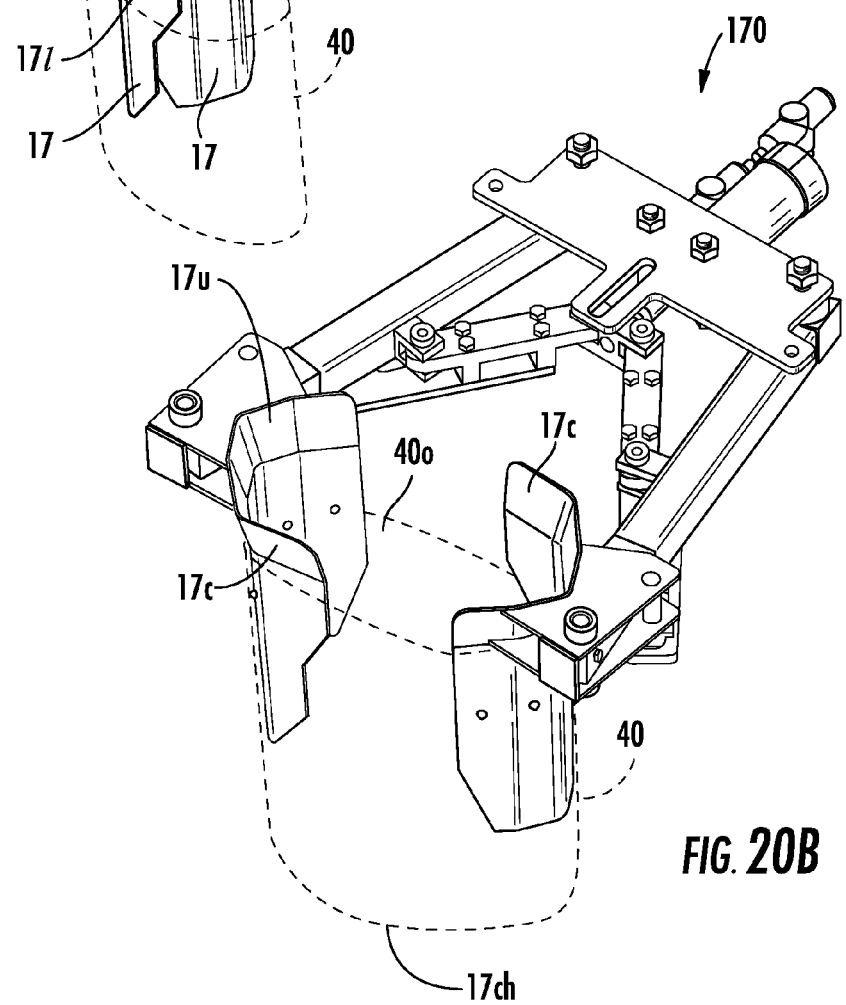
FIG. 20B is a top perspective view of the horn shown in FIG. 20A with the horn members spaced apart according to embodiments of the present invention.

As shown in FIGS. 1-3 and 5, each holding station 14 can include a pair of spaced apart arms $16_1$, $16_2$ that each hold a downwardly extending horn member 17. In operation, the horn members 17 extend inside an open bag 40 (see, e.g., FIG. 4). The horn members 17 can include an upper portion 17u that tapers inwardly a distance to merge into a long portion 17l. The long portion can be sized and configured to reside inside a respective bag 40 (FIG. 4) and the upper portion 17u of the pairs of horn members 17 can act as a funnel or chute 17ch (FIG. 3, 5) to direct the object to be packaged into the open bag 40. FIGS. 20A and 20B illustrate another embodiment of the horn members 17 and will be discussed further below.

As shown in FIGS. 2 and 6, the lower end portion of the horn members 17 reside proximate an aligned platform 23 with an open center space. The bag 40 can extend downwardly through this space.

Figure 4:
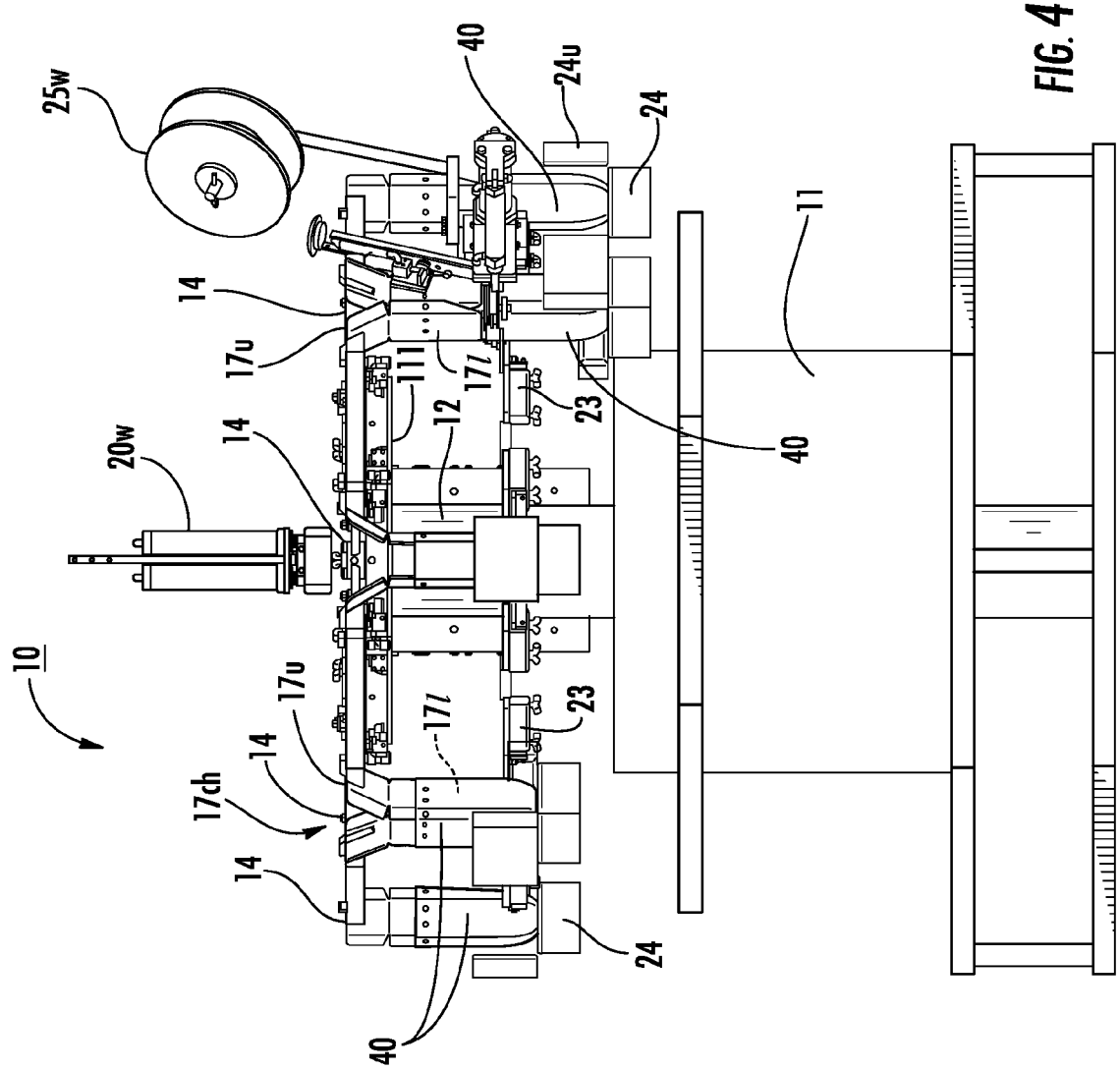
FIG. 4 is another (circumferentially offset) side view of the system shown in FIG. 1.

In some embodiments, as shown in FIGS. 2-4, the holding station 14 can include a base 24 that is aligned with a respective pair of the horn members 17 to hold the bag 40 and, when loaded, the object (e.g., poultry) in the bag 40. The base 24 may include at least one upwardly sidewall (shown as two, an inner and outer sidewall) for helping to hold the object/bag 40 in position. Where used, as shown, the inner sidewall 24u may be shorter than the outer sidewall.

[In other embodiments, the holding stations 14 can include a pair of clamps 23c that close toward each other to hold the object in the bag 40. The clamps 23c can be mounted to the platform 23 or other mounting member (see, e.g., FIGS. 10-15) and may reside in the center open space thereof (FIG. 5). Combinations of a base and clamps or other clamps and/or components may also or alternatively be used. That is, it is contemplated that other releasably configured holding members/configurations may be used. The platforms 23, clamps 23c and/or bases 24 can be configured to automatically travel up and down at various locations along the travel path as discussed above. In operation, in some embodiments, the bag 40 can be pulled off the horn members 17 of a respective station 14 between the hocking workstation 20w and clipper workstation 25w while clamped via clamps 23c.

The arms $16_1$, $16_2$ can be pivotably connected to a linkage 18 in communication with an actuator 19. The actuator 19 can be connected to a controller 200 (FIG. 10) (e.g., HMI) that automatically controls when to move the arms $16_1$, $16_2$. The arms $16_1$, $16_2$ can move inward and outward a distance relative to each other via the actuator 18 and an automated control/drive system (the spacing can be adjusted according to size of the bag and/or object for packaging and/or to provide the desired spacing for different operations such as to cooperate with the hocking station). Pneumatic, hydraulic or electrical lines for the actuators 18 can reside inside the column 12.

Referring to FIGS. 1-4, the bases 24 can rotate independently of the arms/horn members $16_1$, $16_2$/17, but typically the base 24 and the corresponding arms/horn members $16_1$, $16_2$, 17 rotate together about the travel path 10p. The base 24 and arms/horn members $16_1$, $16_2$, 17 can include separate (and synchronized) drive systems for the travel path 10p or each can be attached together and use the same drive system.

The clamps 23c can rotate independently of the arms/horn members $16_1$, $16_2$/17, but typically also rotate with the corresponding arms/horn members $16_1$, $16_2$, 17 about the travel path 10p. The platforms 23, clamps 23c (FIG. 17A) and arms/horn members $16_1$, $16_2$, 17 can include separate (and synchronized) drive systems for the travel path 10p or each can be attached together and use the same drive system.

An inner portion of the platform 23 can be attached to the platform 11 via the center column 12. The platform 23 can also be attached to the base 24. Thus, rotation of the column 12 can rotate the bases 24. Alternatively, the bases 24 and/or platforms 23 (without the bases and/or with the clamps 23c) can be mounted to the column 12 and rotate relative to the column via a drive system such as a linkage, belt, chain, rails, gears, rollers and the like.

In some embodiments, as shown for example in FIG. 5, the platforms 23 can be (indirectly) attached to a pair of the arms $16_1$, $16_2$ and can rotate based on rotation of the arms. The arms $16_1$, $16_2$ can rotate based on a drive system that rotates the column 12 or the arms $16_1$, $16_2$ can rotate about the column 12 using a drive system, e.g., linkage, chain, rails, gears, rollers and the like.

Figures 8, 9:
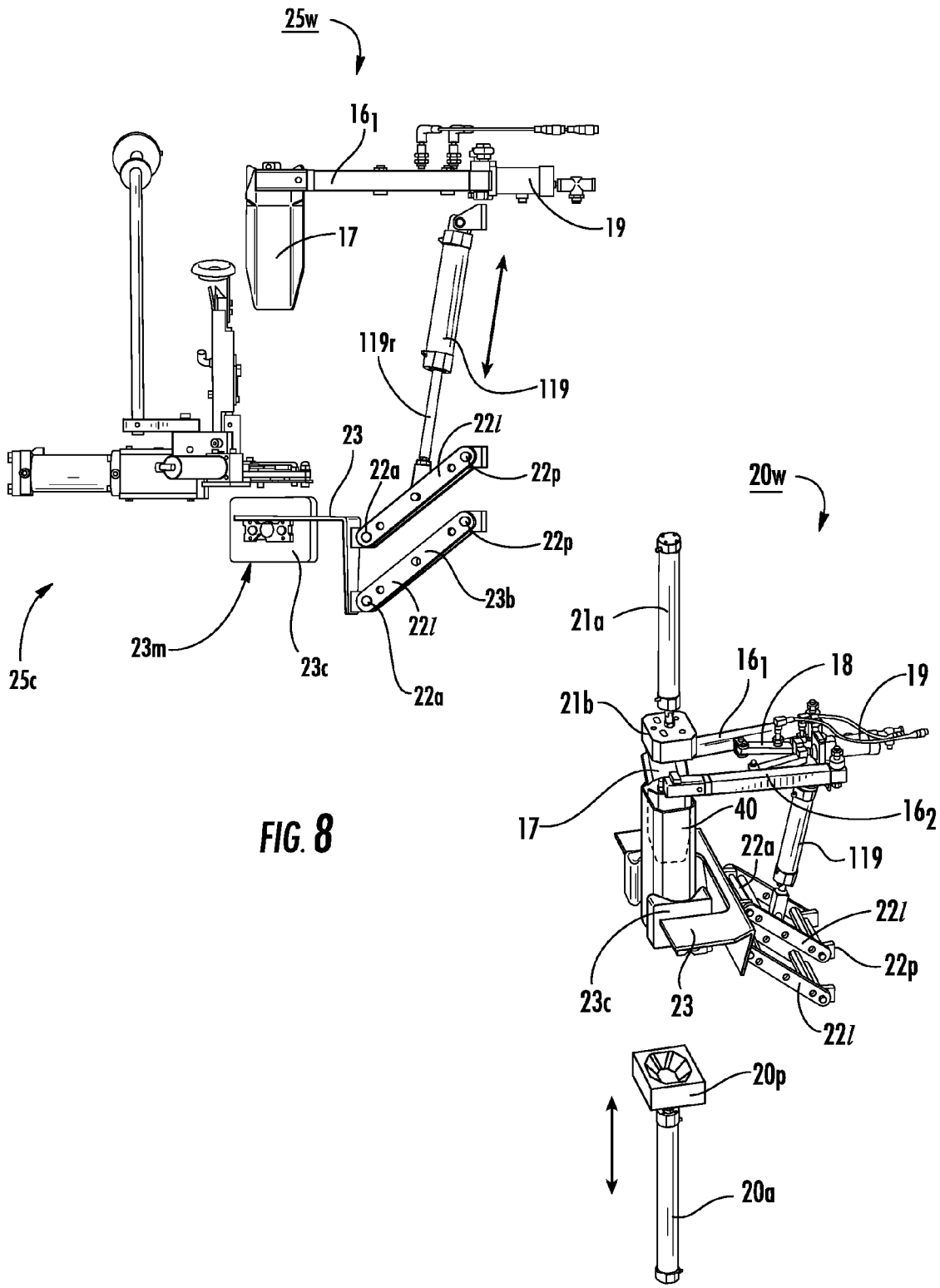
FIG. 8 is a side view of a holding station positioned proximate a clipping workstation of the system shown in FIG. 5 according to embodiments of the present invention.
FIG. 9 is a side perspective view of a hocking workstation associated with the system shown in FIG. 5 according to some embodiments of the present invention.

The system 10 can be configured so that each base 24 (FIG. 2) (where used) and/or clamping mechanism 23m (FIG. 8, 17A) is connected to the mounting frame 11 (FIG. 8, 17A). The mounting assembly can comprise an inline chain and rollers (not shown) with two separation points that allow a respective base 24 and/or clamp mechanism 23c to automatically lower and rise with respect to the column 12 and/or aligned arms $16_1$, $16_2$ at various locations along the travel path 10p as was discussed above.

Figure 17A:
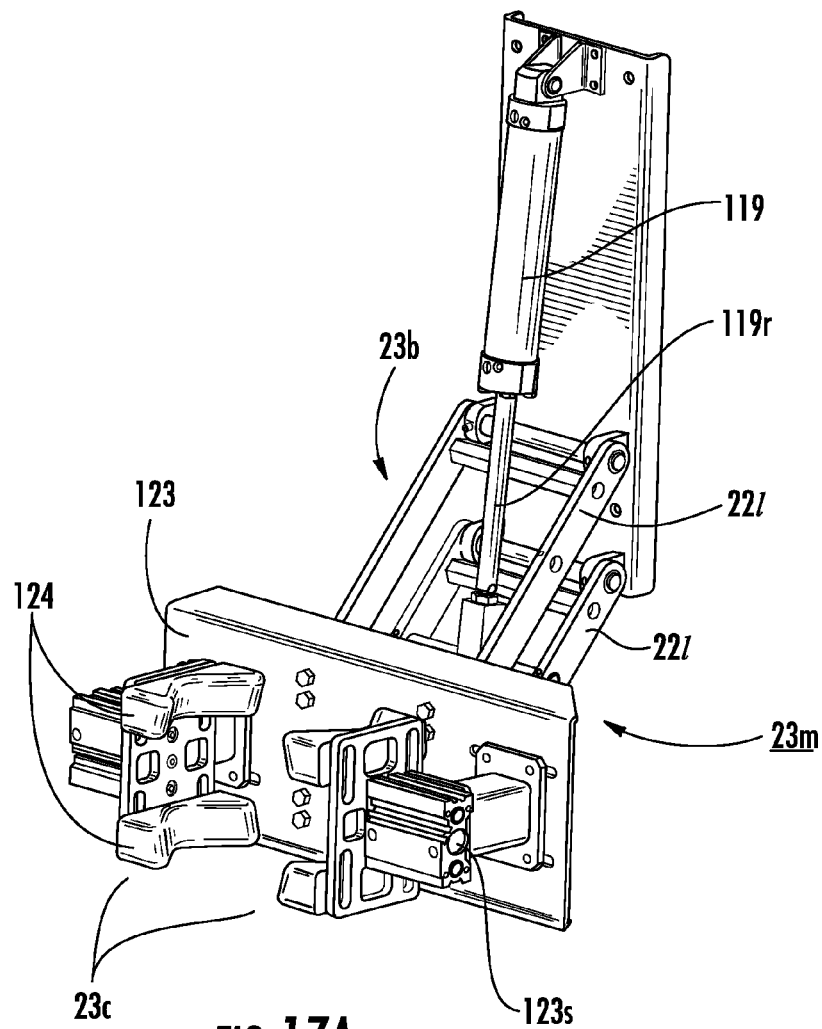
FIG. 17A is a side perspective view of a clamp assembly according to embodiments of the present invention.

In some embodiments, as shown in FIGS. 8 and 17A, an actuation cylinder 119 with an upwardly and downwardly translating rod 119r can be attached to a pivoting bracket 23b that can automatically extend and retract the clamping mechanism 23m (with platform 23 and clamps 23c). Although not shown in FIGS. 1-4, a similar actuator and rod assembly can be used to translate the base 24. In other embodiments, the up and down translation can be carried out using other electromechanical configurations such as, for example, a pair of rails that the base 24 and/or clamp mechanism 23m can slide up and down on for the desired rise/drop movements and the like.

In other embodiments, the bases 24 and/or clamps 23c of the respective holding stations 14 can rotate about the travel path 10p while the arms $16_1$, $16_2$ of the holding stations 14 translate back and forth a defined distance without traveling the entire path. In yet other embodiments, after the hocking workstation 20w, the clamping mechanism 23c can lower and the corresponding arms/horn members $16_1$, $16_2$, 17 can rotate ahead independently of the clamping mechanism 23c and/or base 24 to advance to the bag loading station 35w where it can be mated to another clamping mechanism 23c and/or base 24, then continue on to the object loading station, then the hocking station. Thus, the clamping mechanism 23c and/or base 24 can provide the bag/poultry support only for the bag loading, object loading and hocking stations. Therefore, there may be a lesser number of the arms/horn members $16_1$, $16_2$, 17 than the clamping mechanisms 23c.

Turning again to FIGS. 1 and 2, in some embodiments, the system mounting frame 11 can include a polygonal collar 111, as shown an octagon for holding eight (8) stations 14. Other embodiments can use other shapes such as, for example, a hexagon for 5 stations 14. FIGS. 10-15 illustrate yet other frame 11 configurations that cooperate with the center column 12.

In some embodiments, some sides of the system 10 can be "blank", e.g., not hold a station 14 (not shown). The collar 111 can be attached to the column 12. The arms $16_1$, $16_2$ can be attached to the collar 111 and extend outwardly therefrom. Typically, the collar 111 is stationary or rotates with the stations 14, depending on the drive system and translation configuration used. A similar collar 111 can be used to support the base 24. However, other mounting configurations can be used to support the arms $16_1$, $16_2$ of each station 14 and/or the clamping mechanisms 23c.

FIG. 5 shows that the actuators 19 for respective pairs of arms $16_1$, $16_2$ can all radially extend outward from the center column 12 or centerline 12c of the mounting platform/travel path 10p. The inner end portions of the actuators 19 can reside closely spaced apart such that the actuators extend outwardly in five equally spaced legs to form a five-leg "star" like shape when viewed from the top.

Referring again to FIG. 5 (and FIG. 10), as shown, the loading station 35w has two load (bag dispensing) portions $35_1$, $35_2$. The loader 35L is configured to allow the sides to rotate about 180 degrees. Thus, in some embodiments, the bag loading station 35w is a dual station loader 35L allowing for a 180 degree rotational setup. Bags can be loaded on one side of the dual bag station while the machine is running in normal operation mode using the other side of the dual bag dispensing station. The loading portions $35_1$, $35_2$ can each hold sets of wicked bags (typically at least about 120 pre-wicked bags). Examples of wicked bags with absorption pads will be discussed with respect to FIG. 16C. The dual bag loader 35L can automatically rotate the loaded side into position for use and the empty side into position for reloading. Once the empty side is rotated out of operative position, the system 10 can continue with normal operation. In some embodiments, the loader 35L or system 10 can monitor when to rotate the loader so that the rotation is performed while stations 14 are moved between stations so that rotation of the loader 35L does not slow down or change operation of the system 10. More bags 40 can be refilled on the "empty" side $35_1$ while the system 10 is running with the other side $35_2$, readying the dual bag station for another rotation.

Figures 18A, 18B:
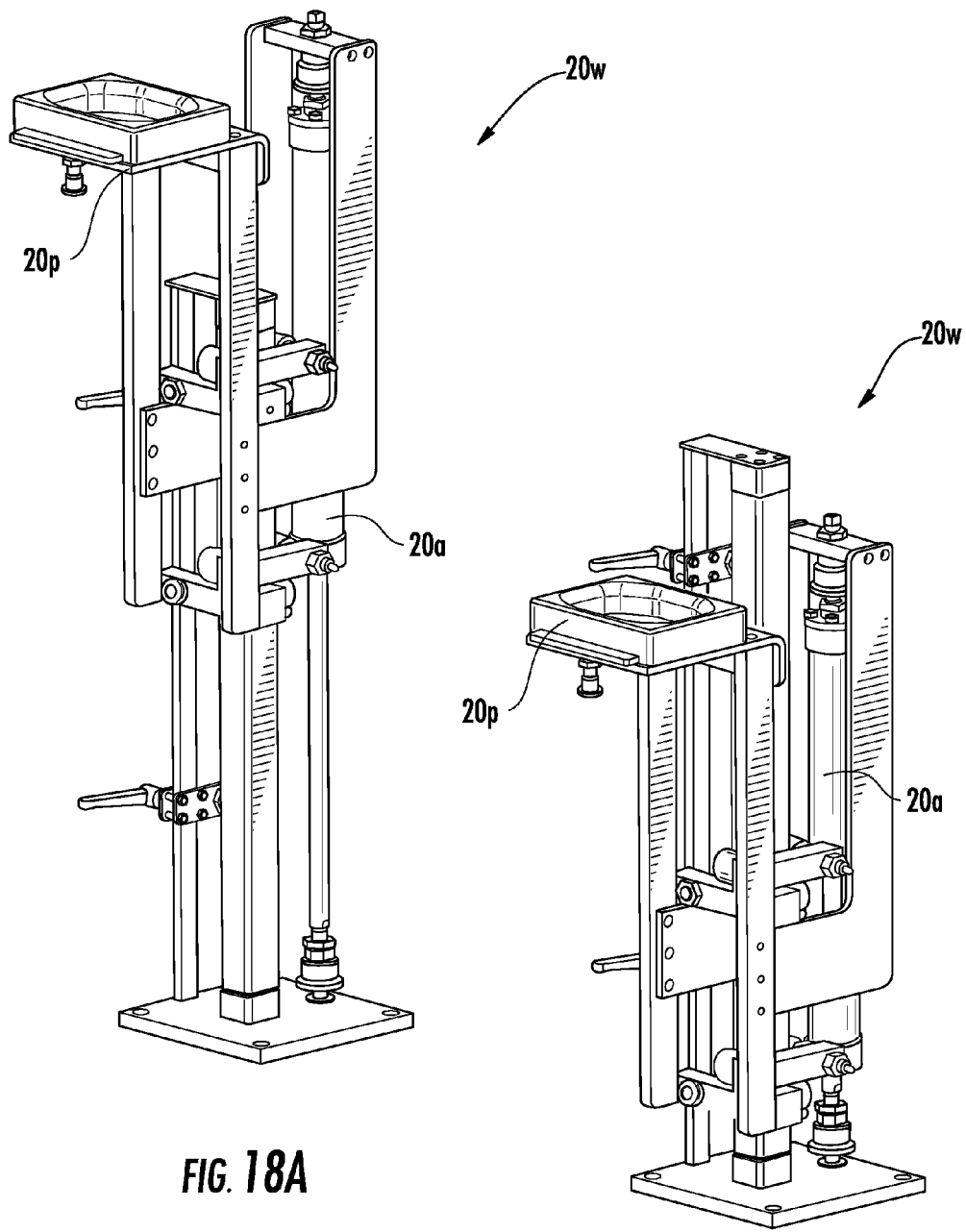
FIG. 18A is a side perspective view of a hocking assembly according to embodiments of the present invention.
FIG. 18B is a side perspective view of the assembly shown in FIG. 18A with the actuator retracted according to embodiments of the present invention.
Figure 19A:
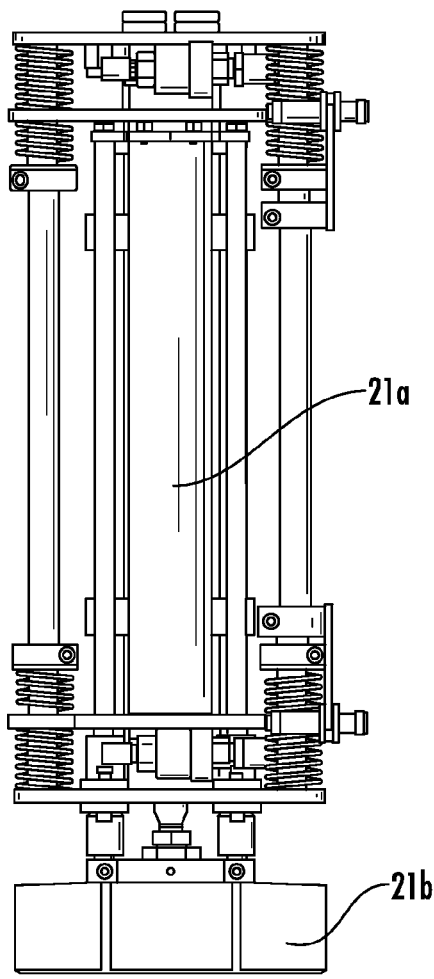
FIG. 19A is a side perspective view of a pusher assembly according to embodiments of the present invention.
Figure 19B:
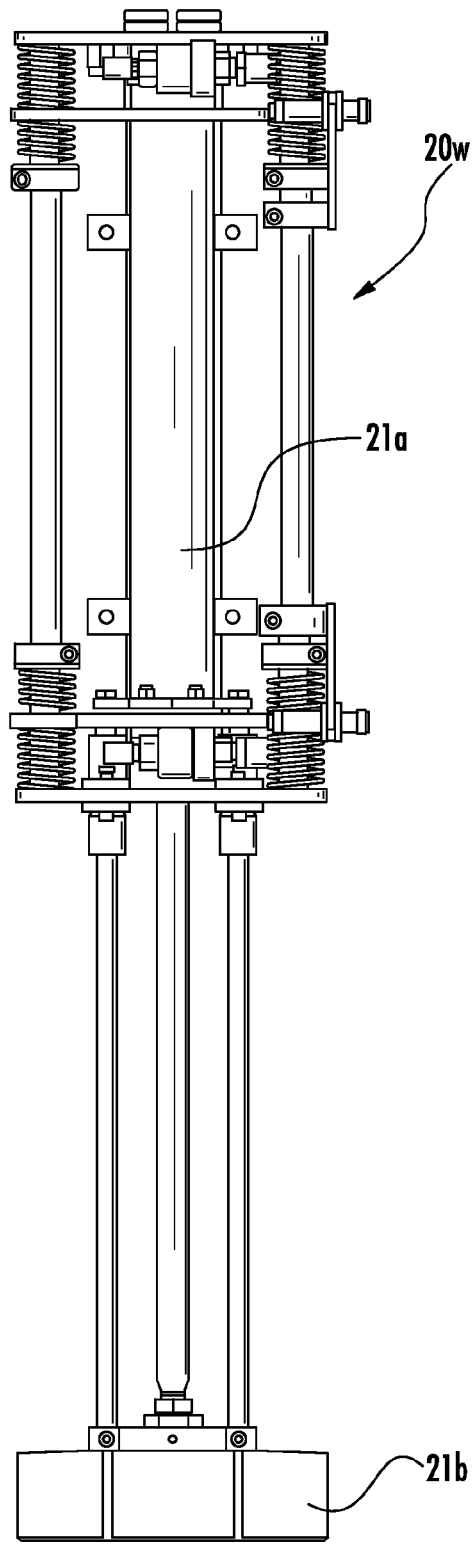
FIG. 19B is a side perspective view of the assembly shown in FIG. 19A with the actuators extended according to embodiments of the present invention.

Turning now to FIGS. 6, 9 and 10, 12, 18A, 18B exemplary pushing and hocking workstations 20w are shown. A receiving plate 20p is attached to an actuation (air) cylinder 20a that rises and allows the bagged bird or other object to rest on it. Once in position, the object in the bag, e.g., chicken, is resting on the receiving plate 20p, where the bird automatically gets hocked. As shown, the workstation 20w can also include an aligned pusher 21 with a pusher block 21b in communication with an actuator 21a. This pusher block 21b is sized and configured to enter into the bag and press the legs of the poultry (e.g., chicken) up against the body (of the chicken), referred to as "hocking the legs". While the pusher block 21b has the legs hocked, the bird is clamped, typically via clamps 23c, from both sides to hold it in position. Additional or alternative air-cylinder driven clamps may be used to hold the hocked legs in place. While the bird is being held or clamped via clamps 23c, the pusher block 21b and the receiving plate 20p retract to their original ("home") positions (FIGS. 7, 18B, 19A). The system 10 then rotates the holding station 14 from position 2 to position 3, while the bird is held in the hocked position, typically by side clamps. In other embodiments, a clamp can be attached to the bag and/or in the bag (and can even be packaged with the whole bird in the bag) to provide the clamping force. FIGS. 23A-23D illustrate that the workstation 20w is a pushing workstation which cooperates with a hocking unit that is integrated into the translating (clamp) stations 14.

Figure 13:
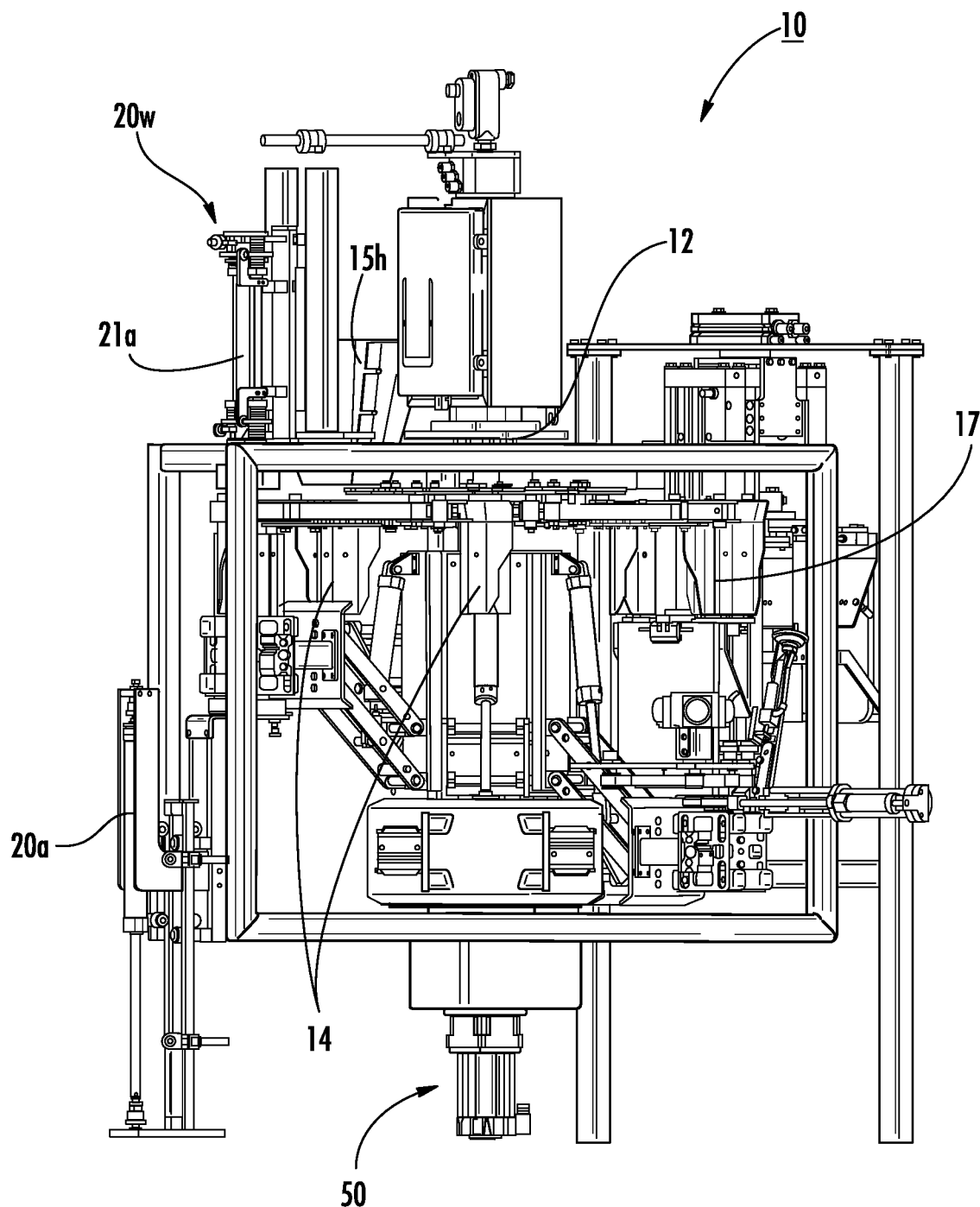
Figure 14:
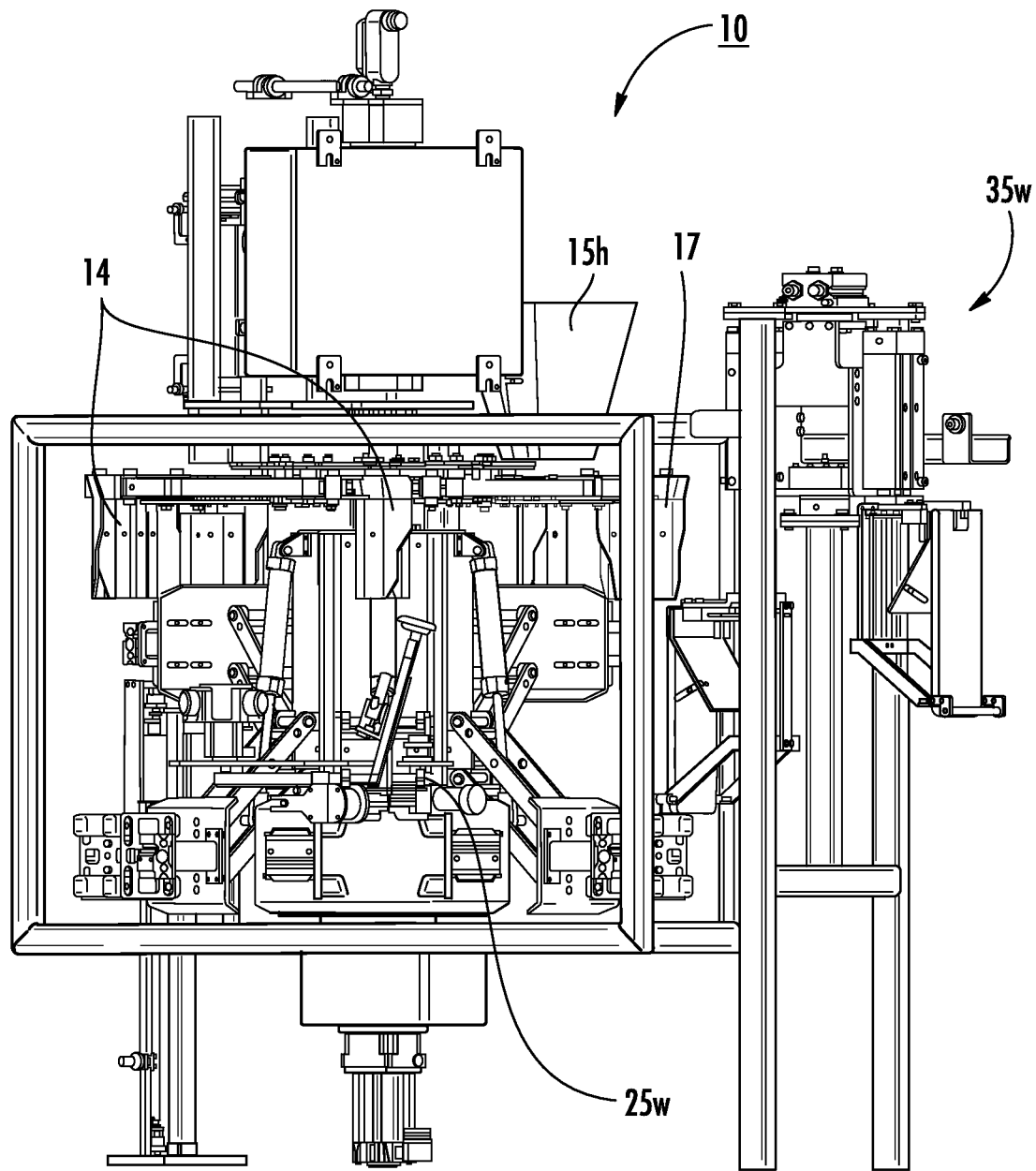
Figure 15:
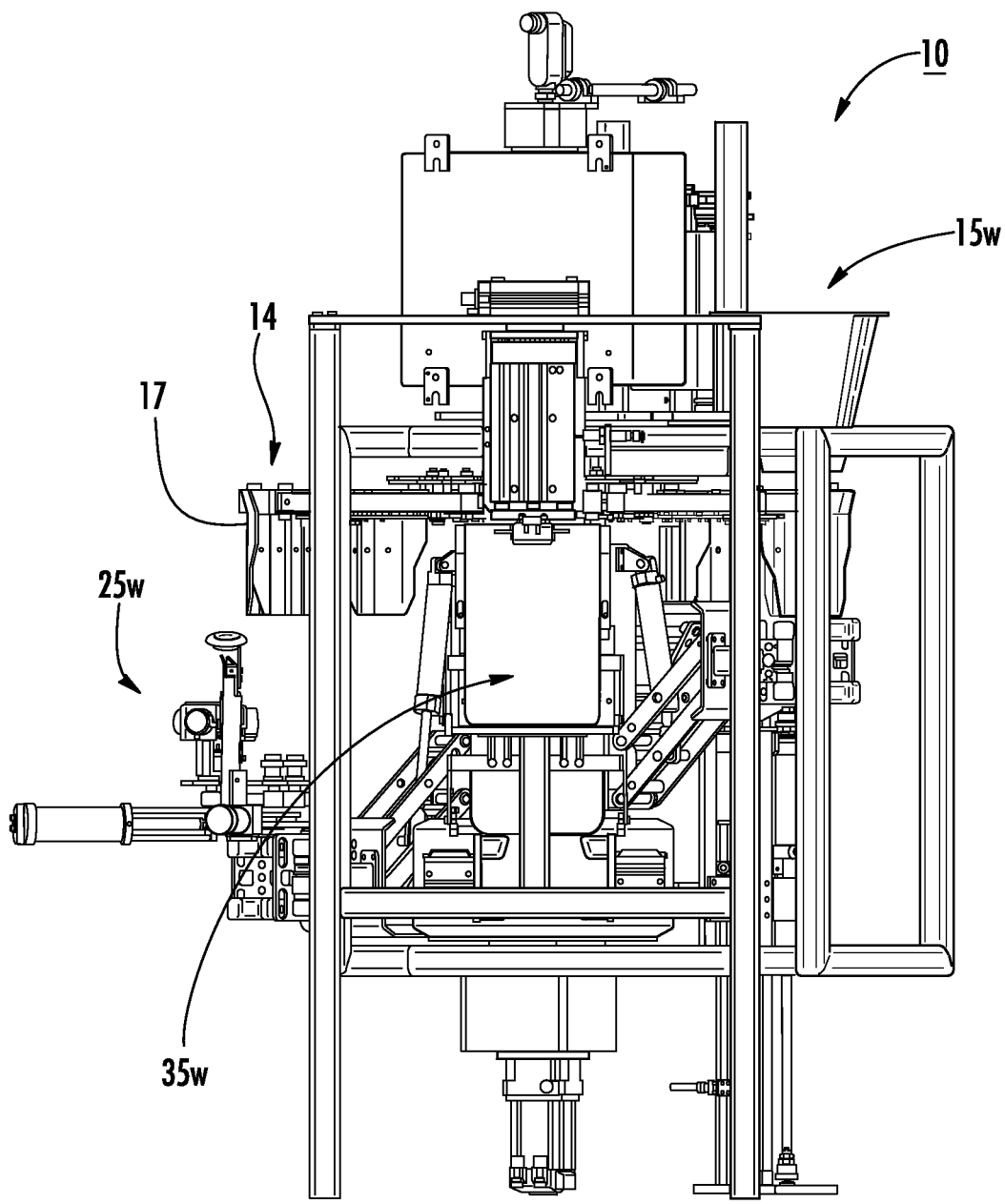

Comparing FIGS. 6 and 7 and referring to FIG. 13 the holding stations 14 at the hocking station 20w, clipping workstation 25w (and bag loading workstation 35w) in FIG. 6 are elevated relative to the position in FIG. 7 and similarly in FIG. 13, for example. That is, the clamps 23c reside above a pivot attachment 22p in FIG. 6 and below the pivot attachment 22p in FIG. 7 (and similarly in FIGS. 11-15 depending on the desired height at different workstations). Thus, FIG. 7 illustrates an exemplary "drop zone".

In some embodiments, while the bird is still clamped via clamps 23c, the bird and clamped portion drop to a different height, readying it for the clipping at workstation 25w at Position 3 (FIG. 1) or Position 4 (FIG. 5, 10). This lowered position allows for the tail end of the bag to be inserted into clipper 25c. The system 10 typically serially rotates the respective holding stations 14 to the clipping workstation 25w after the clamps 23c of a respective station 14 drop into the lower position, but the clamps 23c can drop while rotating or after in the clipper workstation. Also, the clipper 25c may be oriented at an elevated level not requiring a change in elevation of the bag/object. Once in the clipper 25c, the bag tail is gathered, a clip is applied, the knife fires, cutting the bag tail loose from the packaged bird, and the tail is removed by a blower or a vacuum system, or the like. The system 10 indexes again. During the rotation from the clipping workstation 25w to the next location or while stopped (e.g., from or between position 3 to position 4 in FIG. 1 or from or between position 4 to position 5 in FIG. 5), the packaged bird is released, dropping it on a takeaway conveyor or other receiving member (which may be supplied by the customer) or may be provided as an integrated system component.

FIG. 8 illustrates a holding station 14 in the lowered configuration and an exemplary clamping mechanism 23m. As shown, the clamping mechanism 23m includes a bracket 23b with at least one linkage 22l that is pivotably attached 22a at a first end portion to the clamp platform 23 and pivotably attached 22p at the second opposing end to the column 12. The actuator 119 is attached to the linkage 22l and extends up and down to cause the clamps to rise and lower at desired times. As shown in FIG. 9, the bracket 23b includes two linkage assemblies with a pair of links, one linkage assembly 22l residing above the other, that controllably move the clamps 23c in response to actuation of the cylinder 119.

Figure 17B:
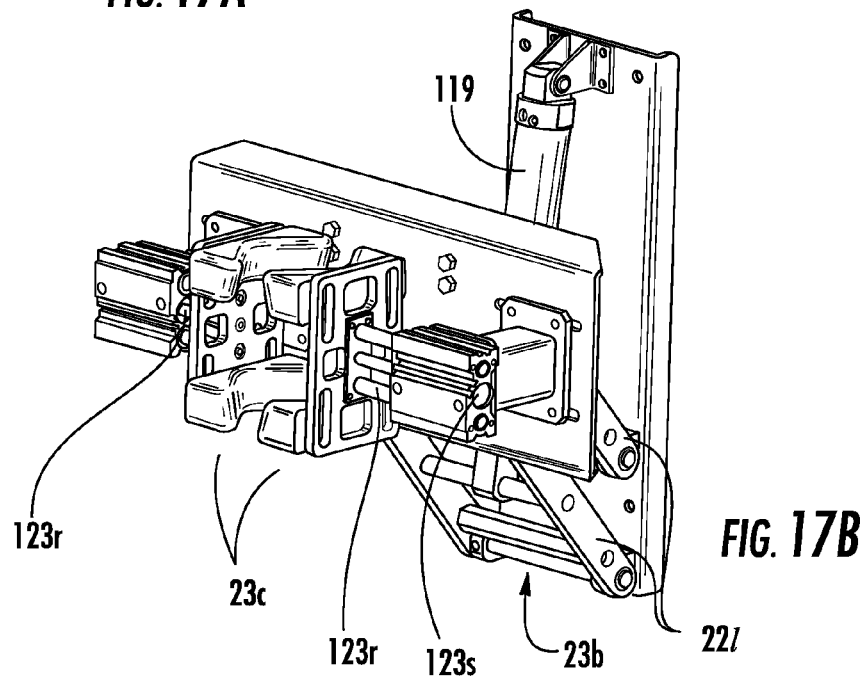
FIG. 17B is a side perspective view of the clamp assembly shown in FIG. 17A with the clamps brought closer together according to embodiments of the present invention.

FIGS. 17A and 17B illustrate a different clamp mechanism 23c and does not require a platform 23 nor base 24. As shown, the clamping mechanism 23m includes a vertical plate 123 which holds a pair of clamps 23c on rails 123r which reside in slots 123s. The clamps 23c are in communication with an actuator that directs the clamps to move together or apart. The clamps 23c slide via the rail and slot configuration in toward each other about the package and outwardly away from each other. As is shown, the clamps 23c can each include upper and lower (vertically spaced apart) gripping members 124. As with the platform 23, the plate 123 can be attached to the center column 12 via pivoting linkages 22l and are in communication with an actuator 119 so as to be able to rise and lower a defined distance at different workstations or locations about the travel path 10p.

For safety, a perimeter frame 11 (also shown as polygonal in FIGS. 1 and 2 and more rectangular in FIGS. 10-15) can extend about the travel path 10 proximate the outer reach of the arms $16_1$, $16_2$ of the holding stations 14 and rotate with or remain stationary with respect to the holding stations 14.

As noted above, FIGS. 10-15 illustrate a similar system 10 to that discussed with respect to FIGS. 5-9. However, the clamp mechanism 23c is configured to slide transversely on rails 123r held in slots 123s a and the clamp configuration is such that no base 24 is required (but may optionally be used). In addition, as shown, the receiving station 15w includes a funnel 15f.

As shown in FIGS. 16A and 16B, the bag loading station 35w is configured to hold wicketed bags 40w (FIG. 15C). Sets of stacked bags 40 can be held by member 135. The bag loading station 35w can automatically peel one bag off the set and place it over the horn members 17 (FIG. 20A, 20B). The bag loading station 35w can include slide rails 136 that translate the holding member 135 up and down. The bag loading station 35w can rotate the two bag holders $35_1$, $35_2$ to present a loaded set when one set is depleted or empty as discussed above. FIG. 16A shows the bag loading member 135 lowered when communicating with a station 14 while FIG. 16B shows a respective member 135 raised for reloading (FIG. 16B). However, as noted above the station 35w need not raise or lower the holders 135 which can be kept at a defined level and aligned with holder stations 14 that rotate into communication with the workstation 35w. It is contemplated that at normal operating speed, bags may be reloaded every 3-10 minutes, typically every 3-5 minutes for 120 wicketed bags 40*w*. It is also noted that the bag loading station 35*w* is shown as having two loaders 35$_1$, 35$_2$ that alternatively move into operative position, but a single one or more than two may also be used.

FIGS. 16C and 16D illustrate an example of a bag with a pad 40*p* for soaking up liquid and for inhibiting punctures from sharp neck bones (e.g., a wicketed bag) 40*w*. Suitable bags are available commercially from Bemis Company located in Neenah, Wis. However, to improve the operation of the bag loading station 35*w* it is contemplated that the bag 40*w* can be configured with angled slits 42 that extend from a top primary edge of the bag rather than a circular opening as is conventional. FIG. 16C illustrates that the slits or perforations 42 can be offset from a centerline of a circular opening. FIG. 16D illustrates that the slits 42 can be angled and extend from a top edge to a distance that is about 0.25-1.25 inches inward thereof. The slits can be a continuous slit or may be perforated for easy tearing.

FIGS. 20A and 20B illustrate a horn assembly 170 similar to that shown with respect to FIGS. 2 and 5. In this embodiment, the horn members 17 are configured to close together and move apart a defined distance to snugly hold a bag 40 thereon (the horn members have a length that extends into the bag). In the spaced apart position, the horn members 17 cooperate with a bag 40 held therearound so that the bag 40 is stretched to define a substantially oval shape 40 (FIG. 20B) at the upper portion thereof. As shown, the horn members 17 each include semi-circular upper portions 17*u* which can be described as a substantially "C" shape 17*c*. When positioned close together as shown in FIG. 20A, one outer leg 17*o* of each "C" shape 17*c* extends a distance beyond that of an adjacent inner leg 17*i* of the other "C" shape 17*c*. The system 10 an automatically move the horn members 17 apart to the spaced apart configuration (FIG. 20B) which stretch/extend the bag 40. The open shape corresponds to a shape of the whole bird for ease of transfer from a shackle system while the closed shape is more compact for ease of loading the bag. The horn members 17 may reside in the position of FIG. 20A or in a different but closer configuration than that shown in FIG. 20B after the whole bird is in the bag, such as after the hocking workstation 20*w* (or after the hocking operation is complete) and before the clipper station 25*w* (or before the clipper operation at the clipper workstation).

In operation, in some embodiments, the bag 40 can be pulled off the horn members 17 between the hocking workstation 20*w* and clipper workstation 25*w* while clamped via clamps 23*c*.

Figure 21:
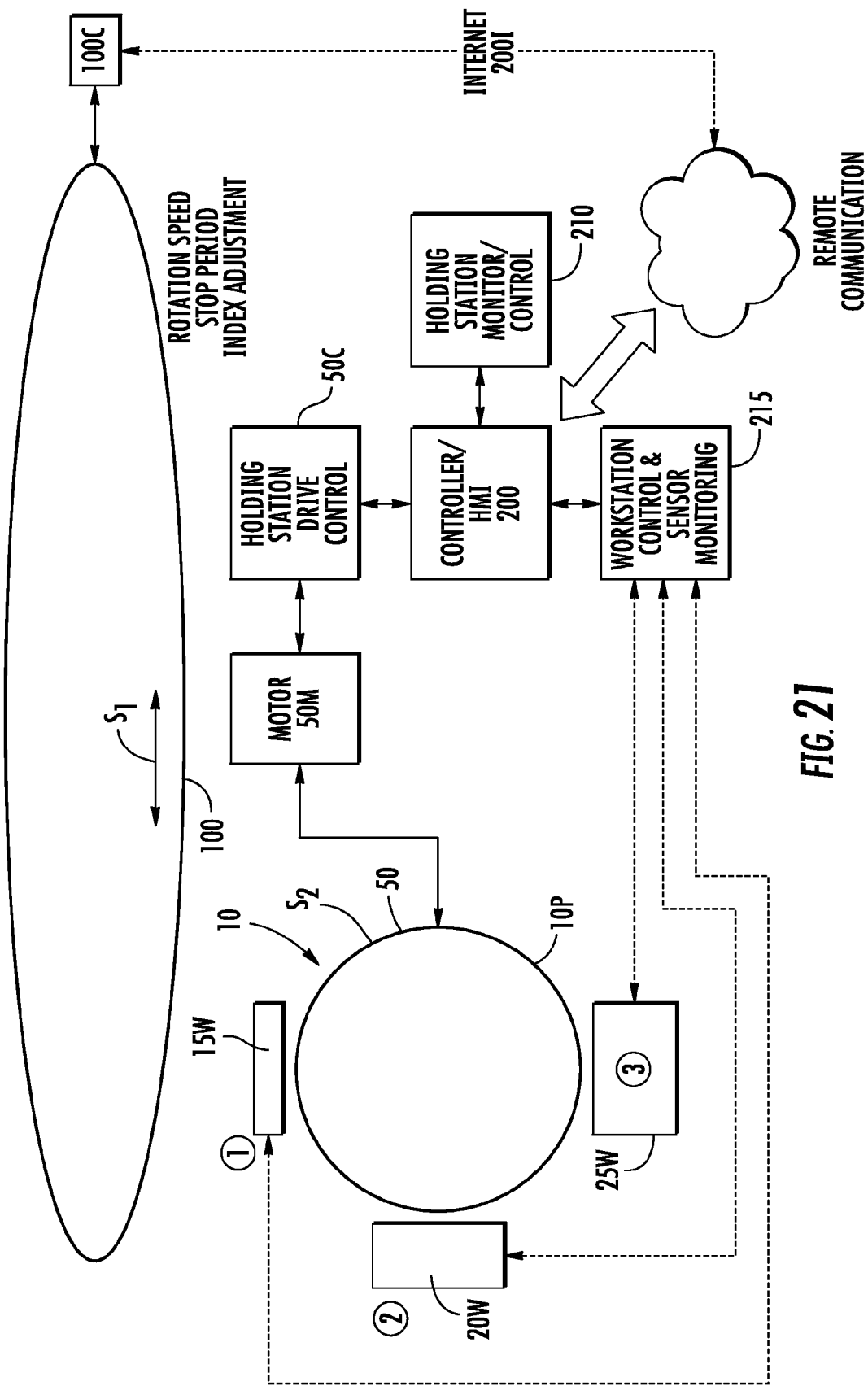
FIG. 21 is a schematic illustration of a packaging system, an input shackle/conveyor system and automated control circuitry according to embodiments of the present invention.

Referring now to FIG. 21, the system 10 can include a drive system 50 with a motor 50M that drives the drive mechanism to translate the center post 12 and/or translate each base 24 or clamping mechanism 23*m* (in concert) and/or arms 16$_1$, 16$_2$ of the product holding stations 14 through the travel cycle along the travel path 10*p*. The system 10 can include at least one controller 200 (e.g., a central processor or more than one controller or processor or Application Specific Integrated Circuit "ASIC") that directs the operation of the system, including, for example, the operations of the workstations, the movement of the holding stations 14 (speed and stop/start times or index/translation distances and the like). The speed of the system 10 can be synched to the input speed of the conveyor/shackle system 100. The controller 200 can also monitor defined operational conditions, such as over-temperatures, pressures, proximity sensors and the like to automate the operation and reduce manual labor requirements. FIG. 6 illustrates the holding station drive control 50*c* as a separate circuit or module 50*c*, but it can be integrated into one module or processor or split into more than one circuit, module or processor and the like. Similarly, the holding station control and monitoring circuit or module 210 and the workstation control and sensor monitoring circuit and/or module 215 are shown as separate from the controller 200 and each other for ease of discussion. However, the function of each of these circuits and modules can be combined or split into other subsystems or circuits/modules (including remote or local circuits and/or modules).

FIG. 21 also illustrates that the controller 200 can include an internet interface 2001 that allows a remote user to access the system for upgrades, diagnosis or repairs.

The controller 200 can comprise a Human Machine Interface (HMI) that is in communication with the drive system 50 and that can comprise an adjustable drive input control circuit with the drive speed being electronically and/or programmatically adjustable as well as the "stop and go" increments being electronically and/or programmatically adjustable.

In some embodiments, the system 10 can communicate with the input feed system 100 such as via a wireless (or wired) interface 100*c* to interactively control the speeds of each system 100, 10 to facilitate efficient loading. The interface 100*c* can be provided using a local area network or a global computer network that allows the systems to communicate. For example, if the speed $S_1$ of system 100 increases, the speed $S_2$ of the rotation of the holding stations 14 can increase accordingly. If the system 100 shuts down, stops, pauses or goes into a "sleep mode" for a operational problem or shift change, then the system 10 may also shut down, stop, pause or go into a "sleep mode" (the latter refers to an operating condition whereby the equipment is not turned off, but less energy is used than an active operational mode).

Figure 22:
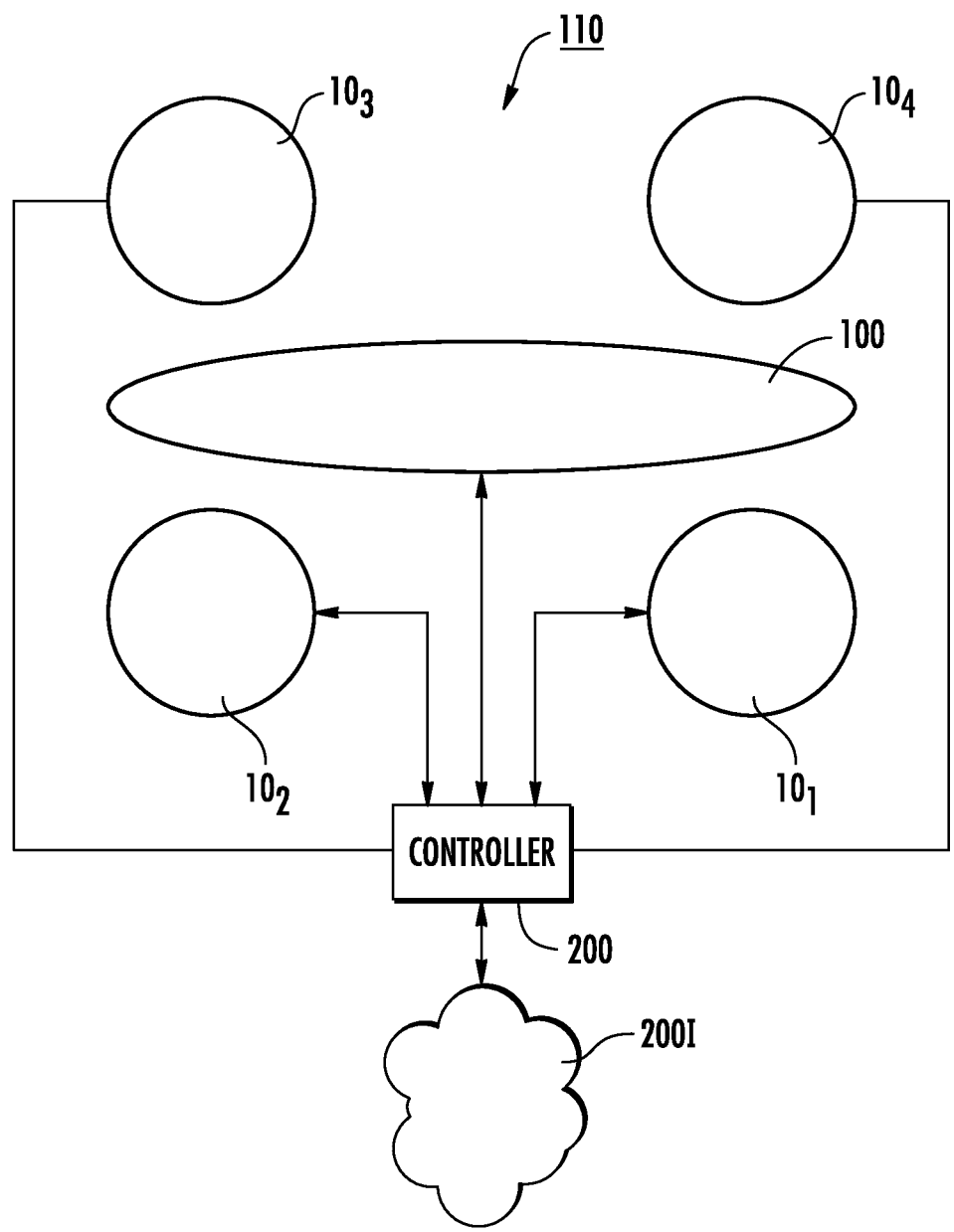
FIG. 22 is a schematic illustration of an exemplary control system for multiple packaging systems associated with one or more input feed systems according to embodiments of the present invention.
Figure 23A:
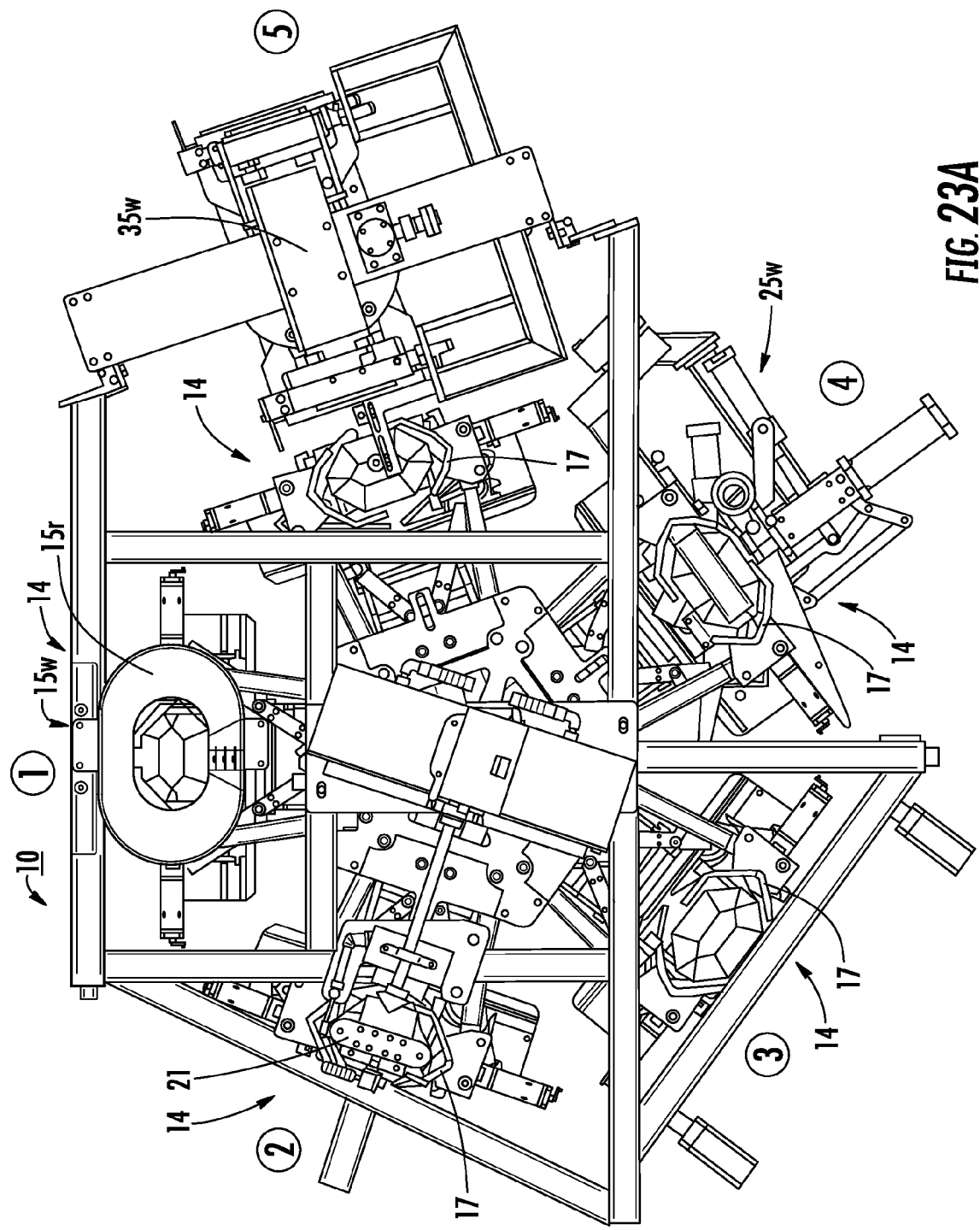
FIGS. 23A-23D are views of yet another configuration of a packaging system where each (translating) holding station includes a respective hocking unit according to embodiments of the invention.
Figure 23B:
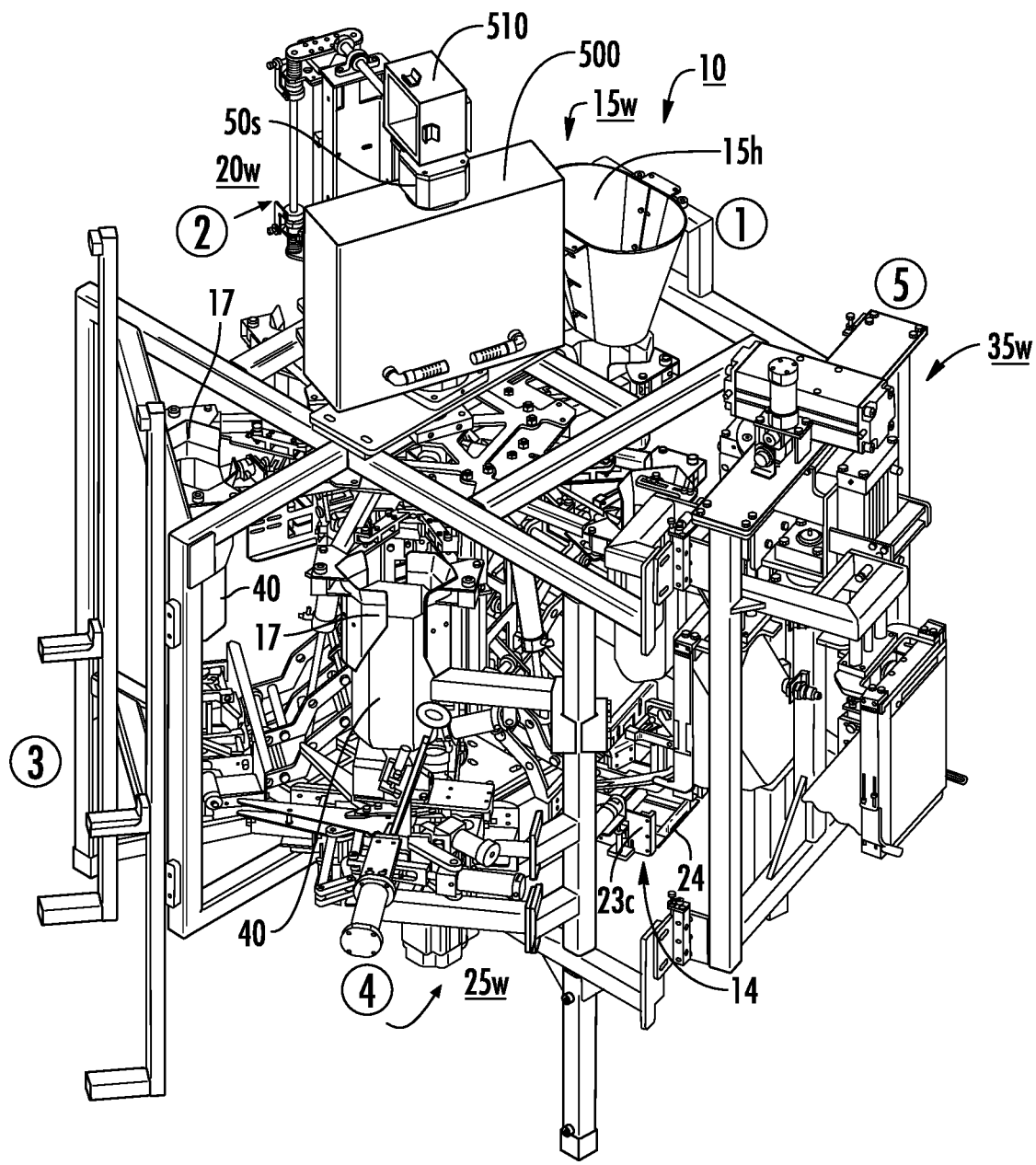
Figure 23C:
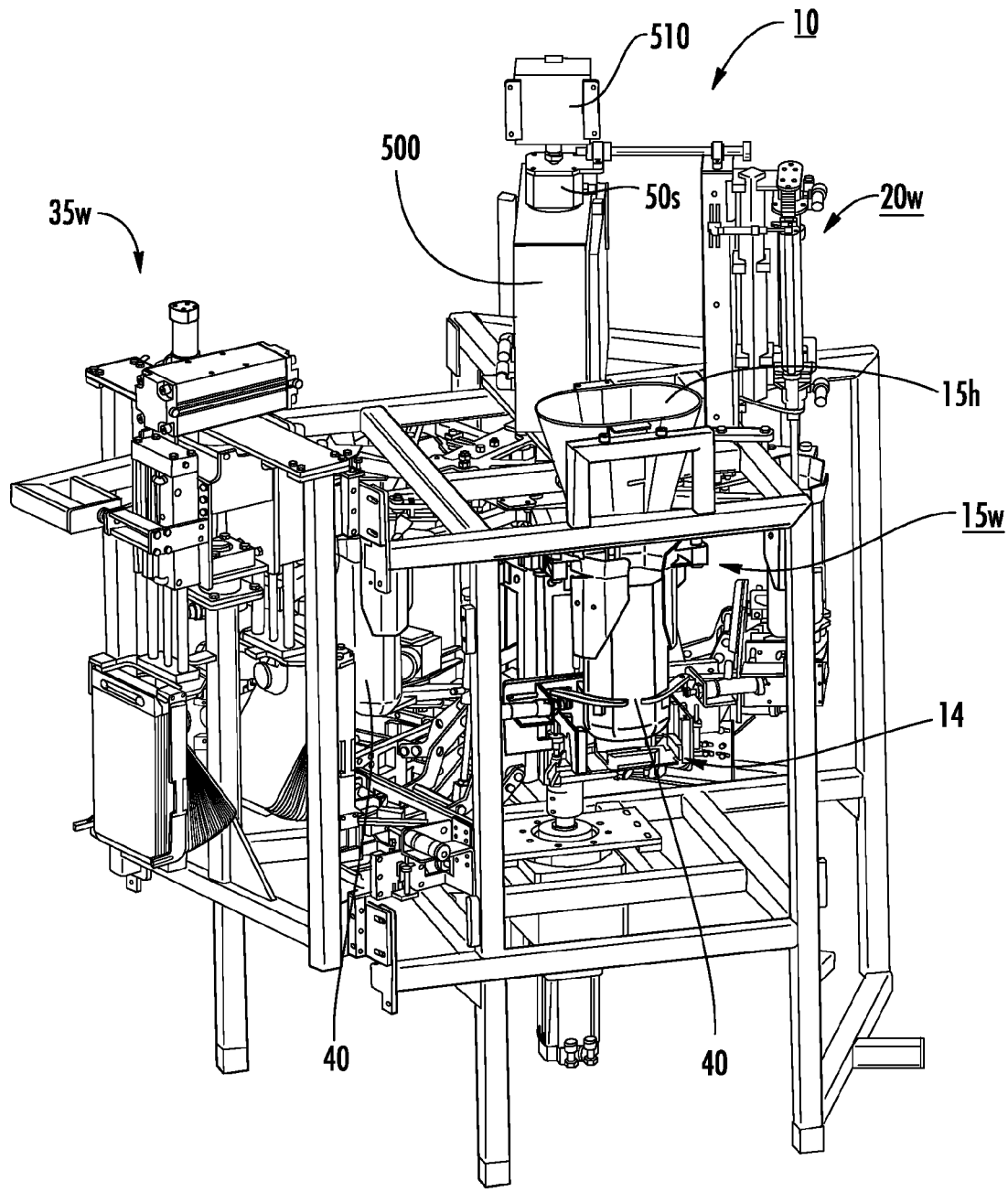
Figure 23D:
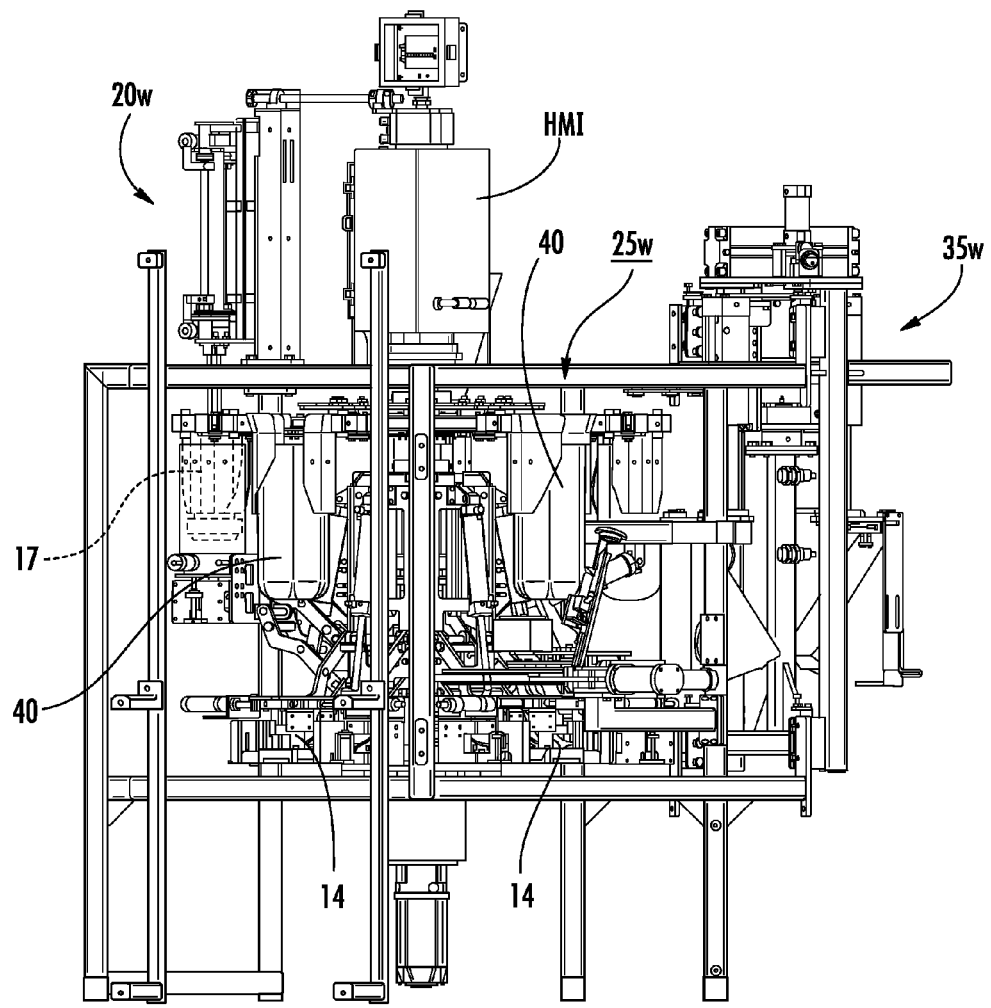

FIG. 22 illustrates an exemplary layout of a packaging system 110 using a plurality of (rotating) systems 10 spaced apart about the input conveyor/shackle 100, shown as four systems 10$_1$-10$_4$, but lesser or greater numbers can be used. Thus, two or more systems 10 can be in communication with one input conveyor system. Indeed, one system 10 can be in communication with two input conveyor systems 100 spaced diametrically apart (not shown) using alternating stations that take and package from the different conveyors. One or more controllers 200 can be used to direct the operations of the systems 10$_1$-10$_4$.

Figure 10:
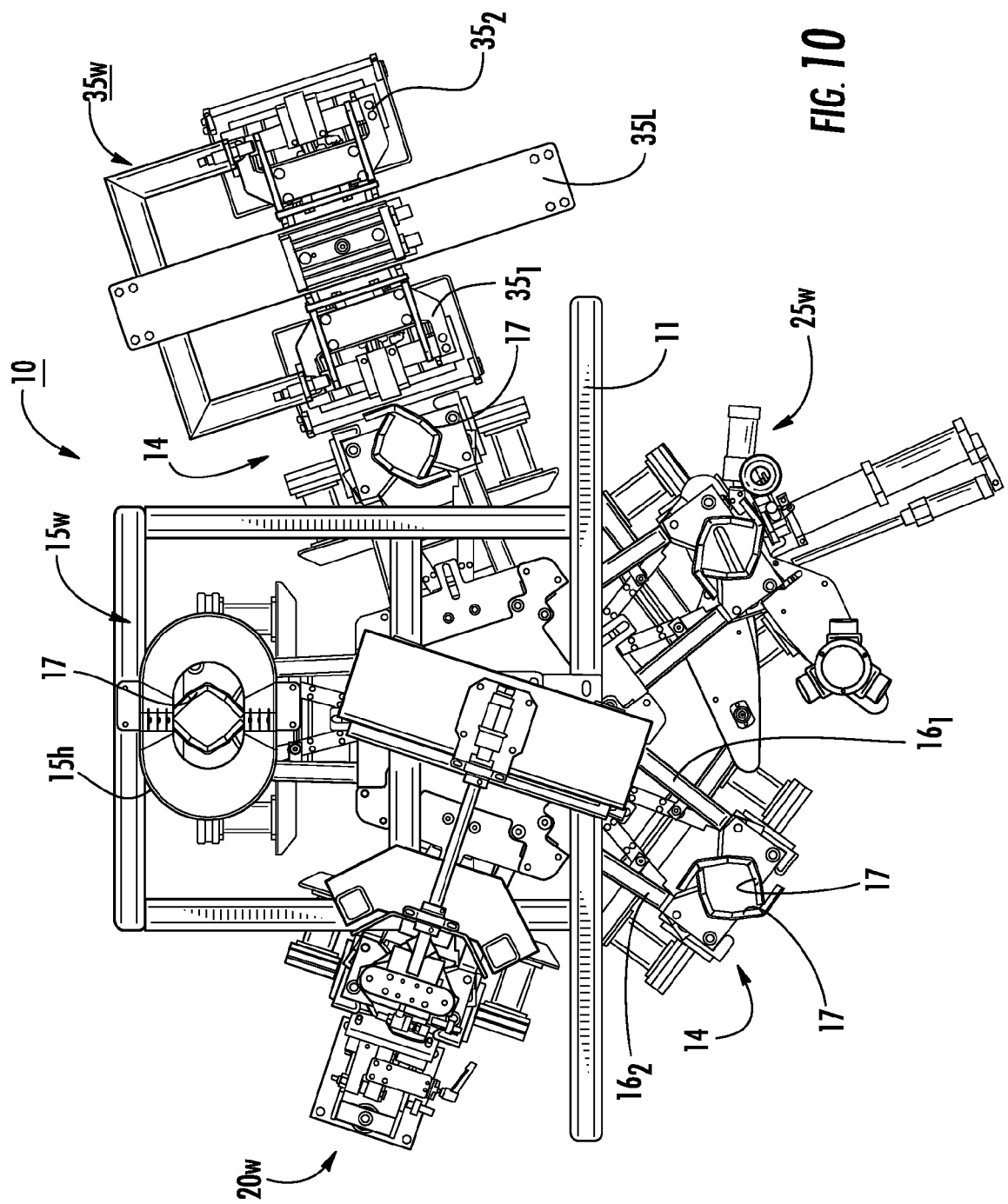
FIG. 10 is a top view of yet another example of a multi-station system according to embodiments of the present invention.
Figure 25A:
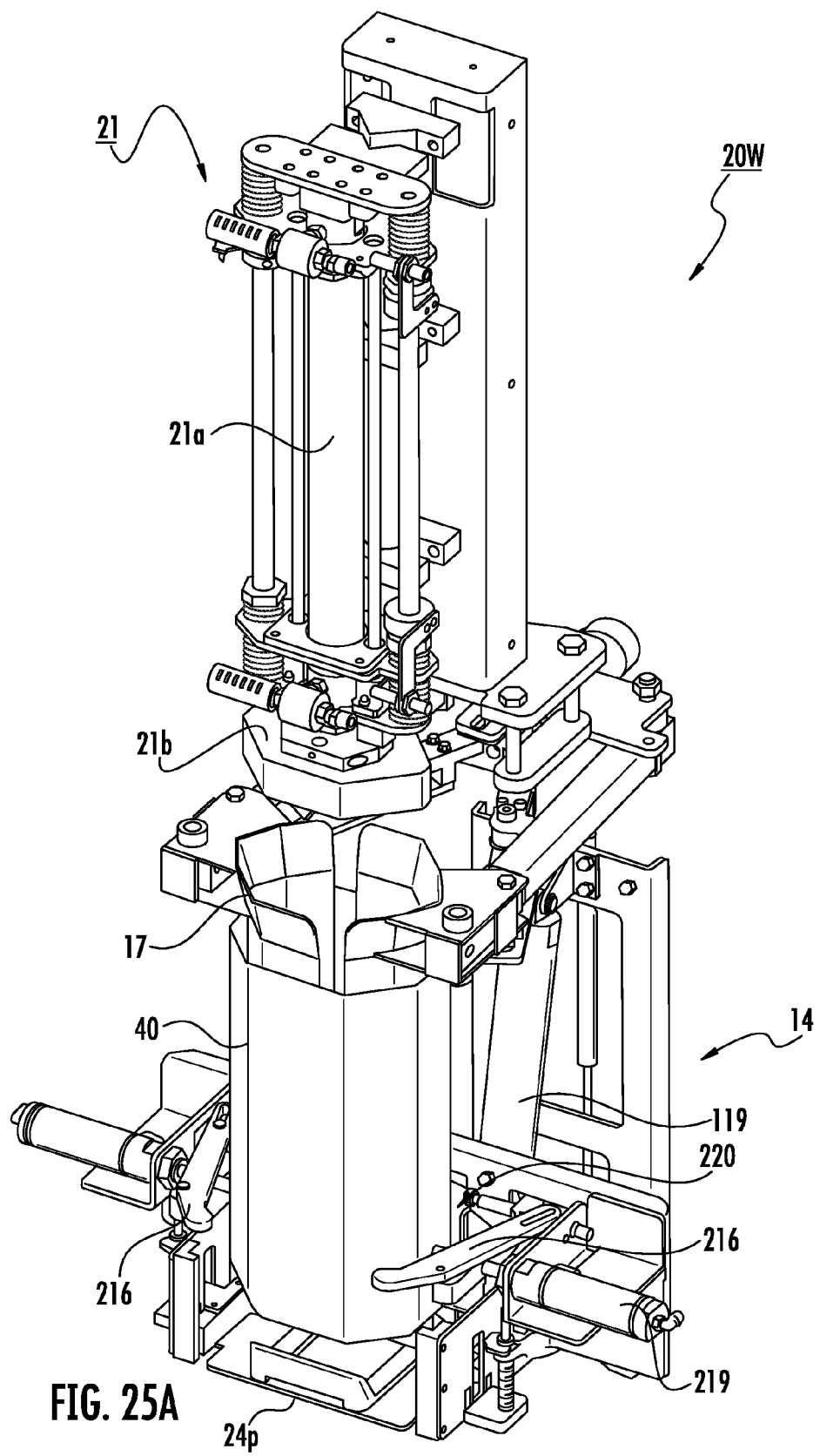
FIGS. 25A and 25B are side perspective views of a pushing/hocking station that cooperates with the onboard hocking components of FIG. 24A according to embodiments of the present invention.
Figure 25B:
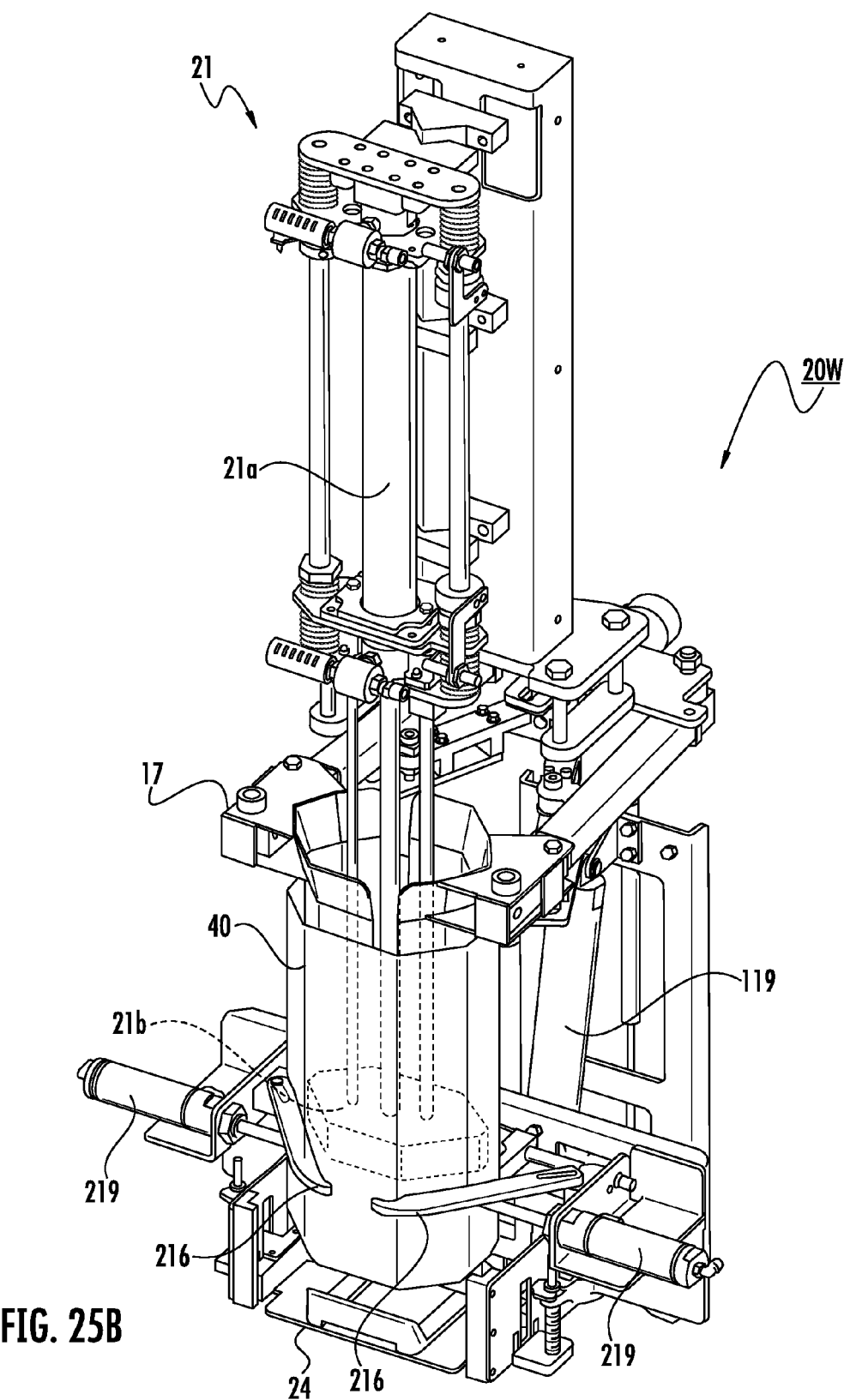

FIGS. 23A-23D illustrate a system 10 similar to that shown in FIG. 10. However, in this embodiment, hocking components are integrated into the holding stations 14. Thus, in this embodiment, the station 20*w* can include a stationary pushing mechanism 21 with a pushing member 21 that pushes down from the top (e.g., like FIG. 6), but does not include other hocking components (e.g., the lower pushing mechanism 20 shown in FIG. 6). Thus, each translating holding station 14 includes integrated hocking components (see, e.g., FIGS. 24A, 24B) that cooperate with the pushing mechanism 21 at the workstation 20*w* to carry out the pushing/hocking operation. FIGS. 25A and 25B illustrate an example of a pushing station 20*w* that serially engages with respective holding stations 14 each having onboard hocking components 24*p*, 216, 220.

Referring to FIGS. 24A, 24B, the holding stations 14 can each include back plates 220 that swing in from a back side of the bag 40 against the poultry and a pair of cooperating fingers 216 that close against legs of the poultry on the front side of the bag. The fingers 216 and back plates 220 can be synchronized to close against the different sides of the poultry at substantially the same time so that the bag 40 with the poultry is substantially centered over or on the base plate 24*p*. To facilitate a snug hold, the fingers 216 and back plates 220 can remain in the capture/hold configuration as the respective stations travel to the clipper station 25w. The fingers 216 and back plates 220 can be used as the clamp mechanism 23m of the stations 14. Thus, the clamp mechanism 23m will clamp front to back instead of side-to-side (FIGS. 9, 17A, 17B). In other embodiments, a four-way clamp system may also be used (not shown).

As also shown in FIGS. 24A and 24B, the holding stations 14 can include a pair of upwardly extending sidewalls 23w that form a portion of a "cradle" on each side of the plate 24p. As described for other embodiments, the holding station 14 can also include an actuator 119 and linkages 22l that are able to move the base plate 24p and other mounted components up and down.

The base 24 can comprise a plate 24p that is spring-loaded 24s. As also shown, the base plate 24p is attached to mounting members 224m that can slide up and down in slots 224s. The spring-loaded configuration 24s can comprise coil springs as shown, or may take the form of resilient blocks, leaf springs, Belleville springs, Clover-Dome spring washers (see, e.g., U.S. Pat. No. 6,705,813), or any other type of flexible elastic member including, for example (polyurethane or other suitable material) O-rings. Combinations of different types of elastic or resilient members and/or more than one of the same type may also be used.

The base plate 24p can be planar, have a block-like shape, or any other suitable shape. As shown, raised edges 24e can be provided to help align the bag/poultry in the holding station 14. The raised edges 24e can be provided by a replaceable guide member that attaches to the plate or the features can be integral with the plate, e.g., machined or molded in.

The holding stations 14 can include linear side actuators 219 that communicate with the fingers 216 and back plates 220. The back plates 220 can include an arcuate slot 220s. The fingers can include an elongate slot 216s and a pin 216p that is attached to an underlying support and travels in the slot 216s as the fingers 216 open and close (FIGS. 24A, 24B). A linkage 222 can attach each finger 216 and back plate 222. The linkage 222 can include a downwardly extending pin $222p_1$ that travels in the slot 220s. The linkage 222 can include a spaced apart upwardly extending pin $222p_2$ on an opposing end portion that is pivotably attached to the front portion of the finger 216. As the respective linear actuator 219 pulls the corresponding linkage 222 outward (FIG. 24B) the fingers 216 pivot open and the back plates 220 also pivot open, in concert, to release the trapped bird. In the reverse, the linear actuators 219 extend to pivot the fingers 216 to close closer together and cause the back plates to close and move inward closer to the fingers 216. However, it is noted that other clamp mechanisms 23m can be used and the back plates 220, where used, can be separately actuated from the fingers 216, where used.

FIGS. 25A and 25B illustrate an example of a hocking/pushing station 20w with the holding station 14 shown in FIGS. 24A and 24B (and as shown in FIGS. 23A-23D).

For completeness, it is noted that after position 2 (workstation 20), typically between positions 2 and 4, the horn 17 may disengage the bag 40 (e.g., retract inward a distance from a perimeter of the bag, raise above the bag and/or close together so as to not push out against the open edge of the bag).

Figure 26A:
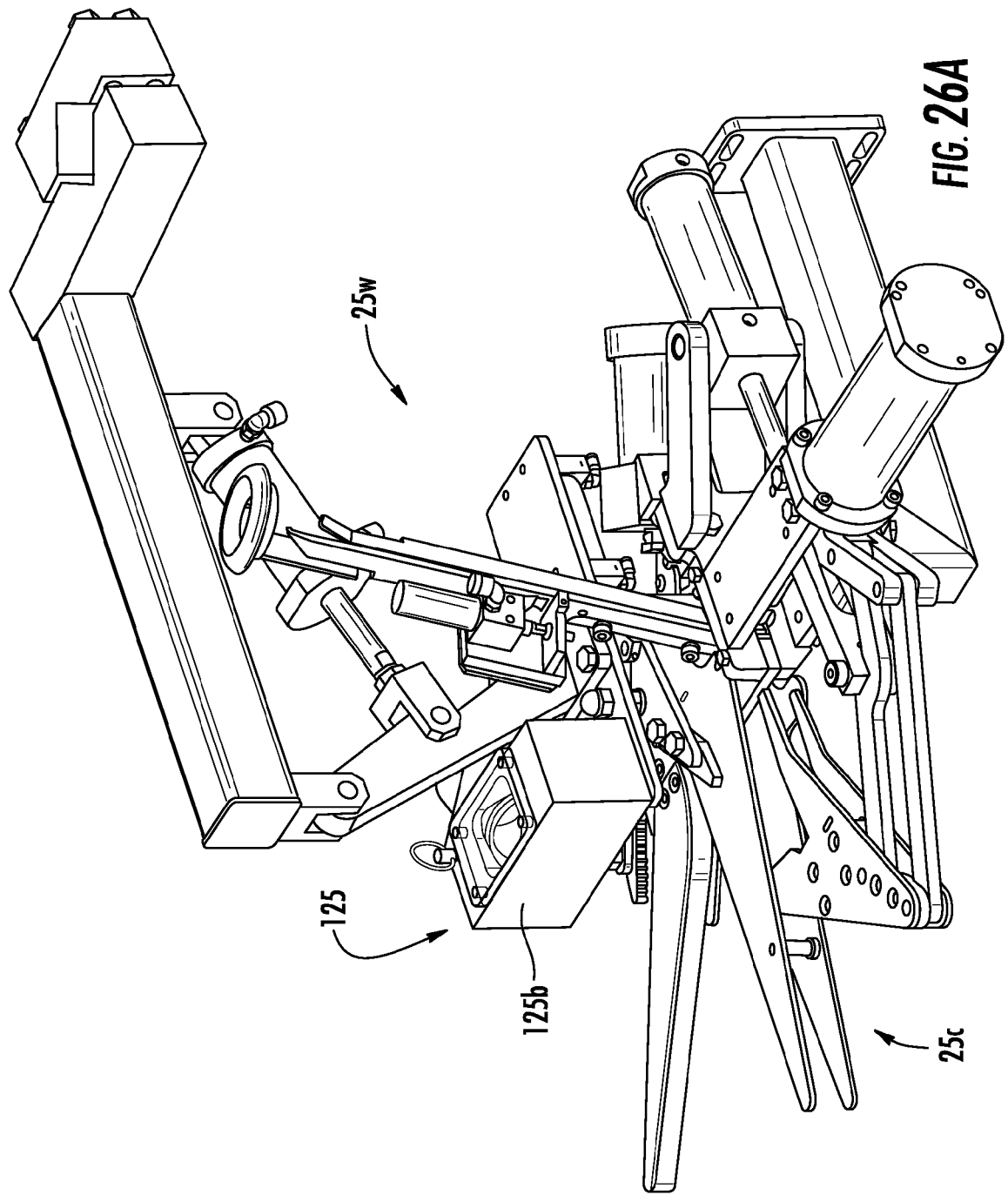

FIGS. 26A and 26B illustrate one example of a clipper workstation 25w (e.g., position 4). This example illustrates a single gate clipper design, but double gate designs may also be used which may change positions and/or configurations of cooperating components (e.g., tail grabs, product pulling device for a tight constant rope diameter and the like). In this embodiment, the station 25w includes a product bag pulling device 125 above the clipper 25c. This device, while not required, helps gather the bag and pull it tight to provide a desired tight and consistent rope diameter. It can also facilitate cutting the excess bag tail off and/or removing it once cut (e.g., via vacuum or the like). As shown, the device 125 can include a vacuum block 125b that can pivot between a horizontal and an angled orientation (FIGS. 26A, 26B). A vacuum hose can attach to the block 125b to pull a vacuum and help pull the gathered bag tail.

Figure 27A:
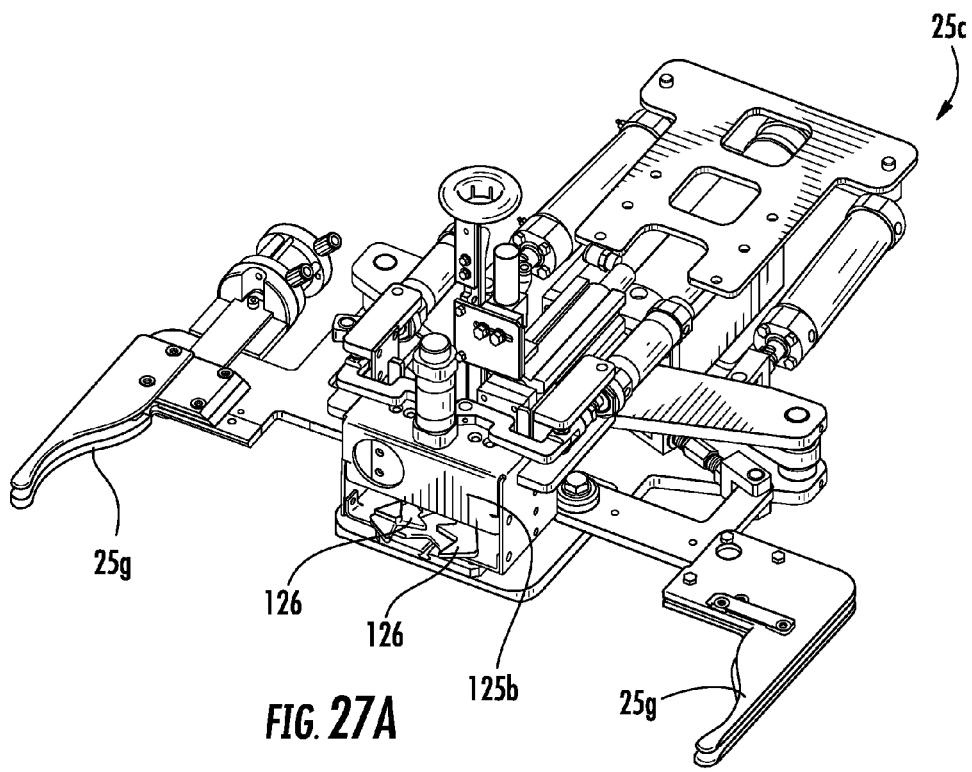
FIGS. 27A-27E are front perspective views of an exemplary clipper for a clipper workstation and a series of operational configurations according to embodiments of the present invention.
Figure 27B:
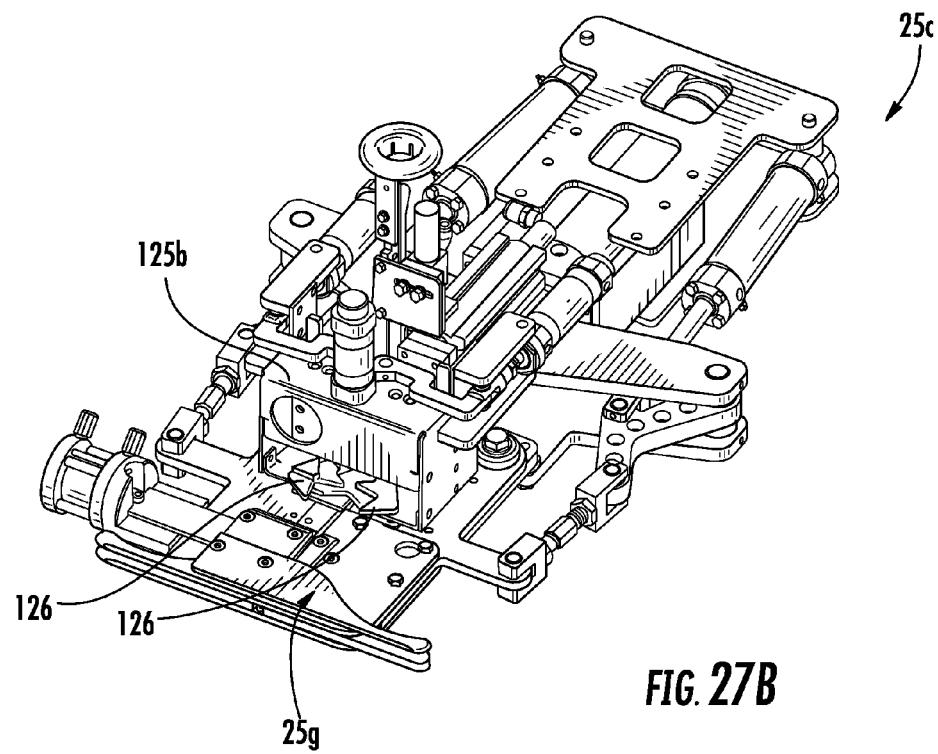
Figure 27C:
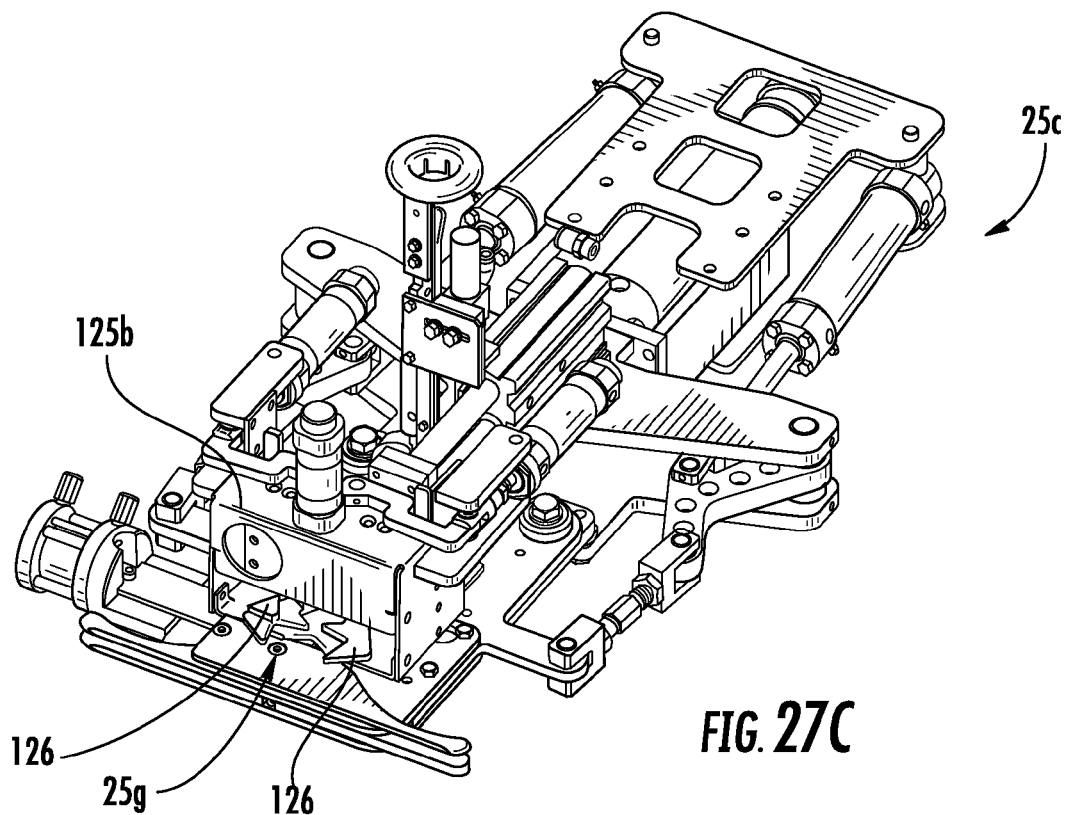
Figure 27D:
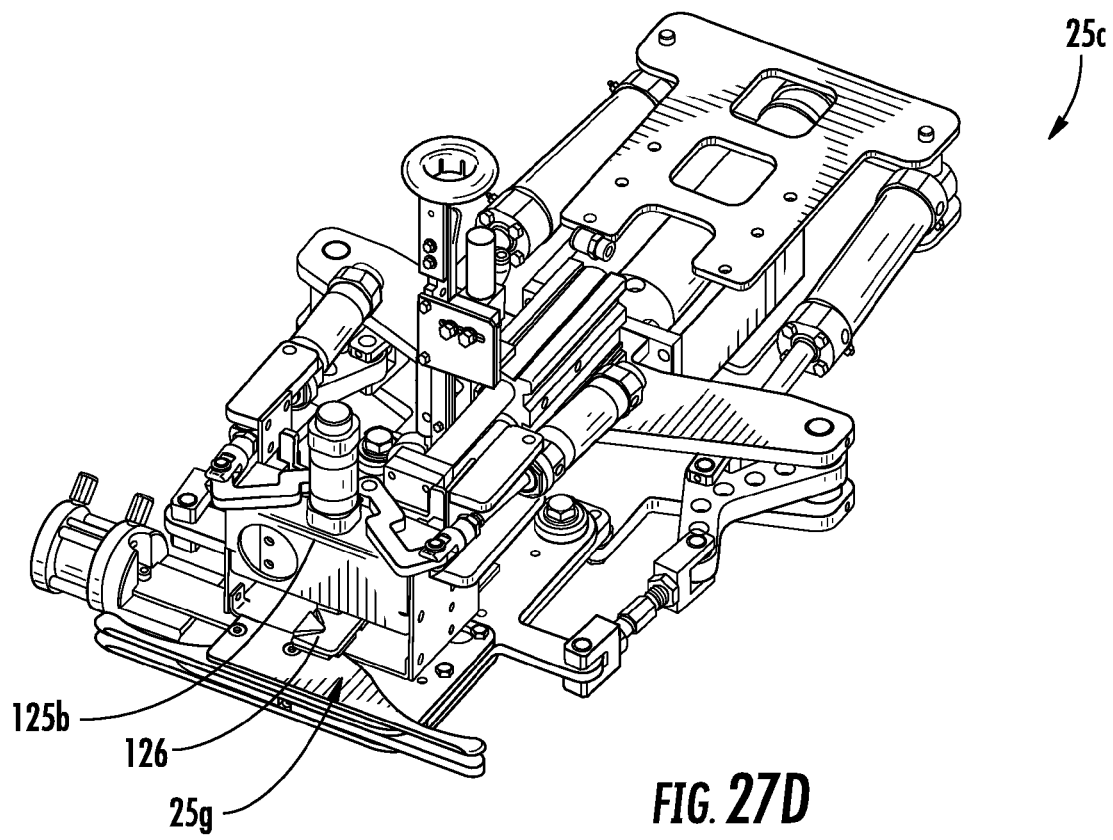
Figure 27E:
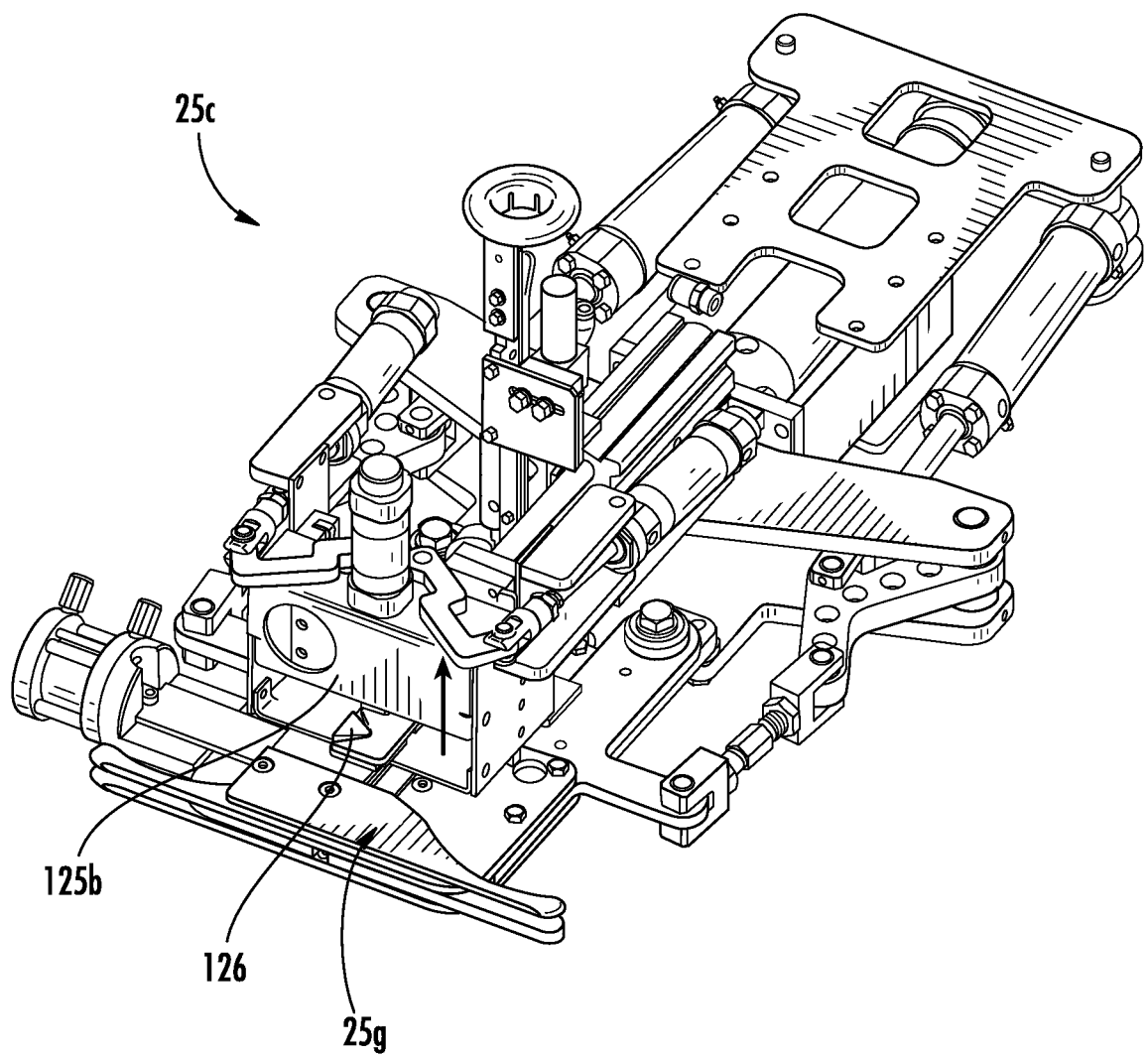

FIGS. 27A-27E illustrate another configuration of a clipper 25c suitable for the clipper workstation 25w. FIG. 27A shows the clipper 25c with the gates 25g open, ready to receive a product for clipping. In operation, a product in the bag 40 rotates around into the open space between the gates of the clipper 25g. As shown in FIG. 27B, the gates 25g then close (around the bag to gather it). The block 125b on top of the clipper 25c can be configured as a combination vacuum/pusher block which, in some embodiments, can have a two-fold function. The bottom of the vacuum block 125b can act as a pusher, which pushes bag down toward the die of the clipper path per FIG. 27C. Grippers 126 that reside over the pusher plate 125b, but above the gates 25g then close on the bag tail as shown in FIG. 27D. The vacuum block 125b raises vertically (as indicated by the arrow in FIG. 27E) with grippers still gripping the bag tail, pulling the bag upwards and tight. At this point, the clipper 25c is ready to clip and cut excess tail off the bag (where cutting is used), completing the cycle. A vacuum is then applied by the vacuum block 125b to dispose of the bag tail. After the clipped bag with product is released, the clipper 25c resets back to the configuration shown in FIG. 27A in preparation for the next cycle with a subsequent product held by a holding station 14.

Figure 28:
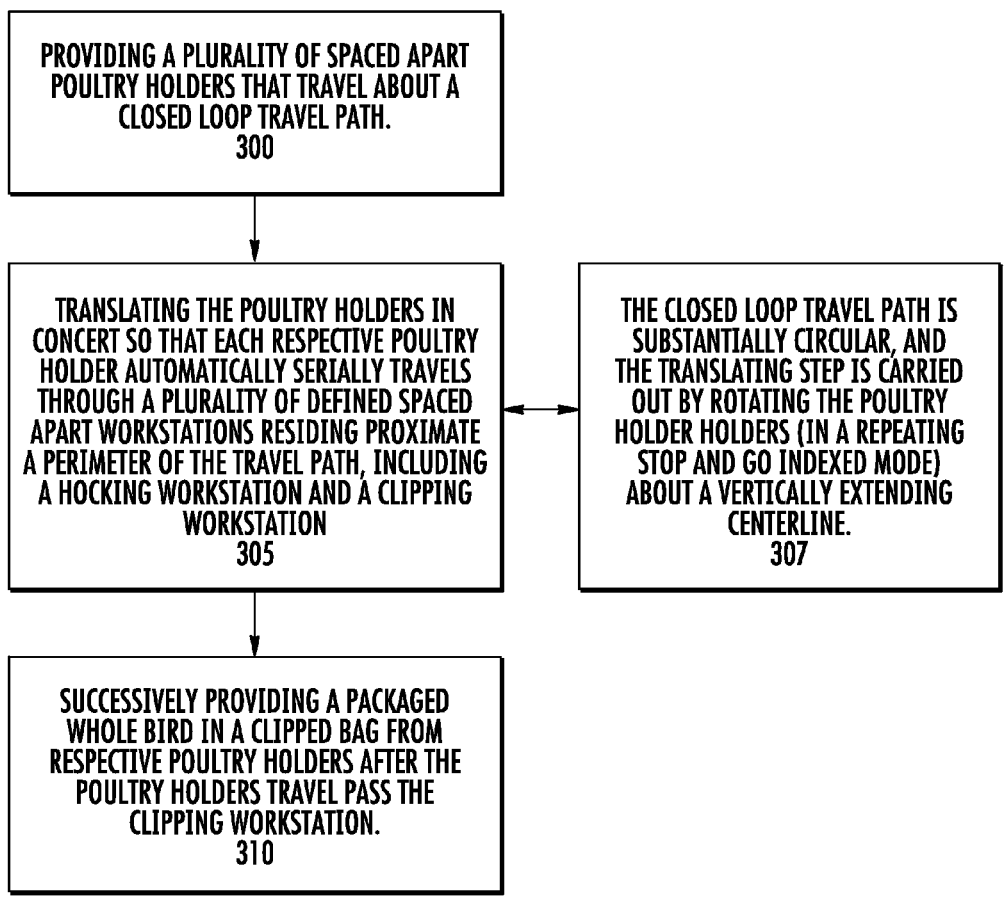
FIG. 28 is a flow chart of operations that can be used to package target product (e.g., whole birds in bags) according to embodiments of the present invention.

FIG. 28 illustrates exemplary operations that may be used to carry out methods of packaging objects according to some embodiments of the present invention. As shown, a plurality of spaced apart poultry holders that travel about a closed loop travel path can be provided (block 300). The poultry holders are translated in concert so that each respective poultry holder automatically serially travels through a plurality of defined spaced apart workstations residing proximate a perimeter of the travel path, including a hocking workstation and a clipping workstation (block 305). A packaged whole bird in a clipped bag is successively provided from respective poultry holders after the poultry holders travel pass (or at) the clipping workstation (block 310). The closed loop travel path can optionally be substantially circular, and the translating step is carried out by rotating the poultry holders (in a repeating "stop and go" indexed mode) about a vertically extending centerline (block 307).

In particular embodiments, the system 10 can package whole bird chickens. The speed of the system 10 can be such that it can provide between about 20-80, typically about 30 bagged, whole birds, per minute. The birds can be packaged using one of two different input systems/methods, depending on the customer's needs. One method can be carried out by receiving the birds from an overhead (over head conveying mechanism, which brings birds to the machine). The other method can be carried out by receiving the birds from a conveying mechanism. An exemplary sequence of operations includes the following for a poultry packaging system (although illustrated using five discrete (four functional) positions, other numbers of positions, functional positions and holding stations can be used and/or some functional positions can be combined at one workstation). It is also noted that the workstations 15w-35w themselves may be configured to travel a define path to cooperate with various holding stations 14. That is, the holding stations 14 may be stationary and the workstations 15w-35w can translate about an endless path about the holding stations 14 to carry out the desired functions. In yet other embodiments, the holding stations 14 and the workstations 15w-35w can travel about defined paths to serially cooperate to carry out a series of defined functions (not shown).

Position 1: Load and Drop. Chicken is dropped from the moving shackle 100 into loading chute 15h and then into horn 17 holding the bag 40 open and forming an entry loading chutes 17ch. The loading chute 17ch has a pre-loaded bag 40 from station/position 5 (35w) attached to it. The chicken slides through the loading chute 17ch into the bag 40. Once in the bag, the chicken position is sensed by a proximity sensor, notifying the system 10 that it is ready to continue. System 10 automatically rotates (e.g., counter clockwise) to Position/Station 2.

Position 2: Pushing and Hocking. In one embodiment, the receiving plate 20p comes up and allows the bagged chicken to rest on it. Once the chicken is resting on the receiving plate 20p it then gets hocked. A pusher 21 comes down from above with a pusher block 21b attached. This pusher block 21b goes into the bag and presses the chicken legs up against the body of the chicken, e.g., hocking the legs. While the pusher block 21b has the legs hocked, the bird is clamped from both sides to hold it in position. Additional air cylinder clamps may be used to hold the hocked legs in place. While the bird is being held, the pusher block and the receiving plate retract to their original positions.

In another embodiment, the fingers 216 and back plates 220 trap (clamp) the poultry in the bag therebetween while the bag with poultry is supported by the plate 24p. The pusher 21 again comes down from the top to extend the pusher block 21b into the bag and presses the chicken legs up against the body of the chicken, e.g., hocking the legs. The pusher block can extend into the bag before or after the fingers 216 and/or back plates 220 are fully deployed. The pusher block is retracted after the hocking is completed.

Machine (holding station 14) rotates (from position 2 to position 3), while the bird is being held by its side clamps and/or by the front and back clamps (e.g., fingers and back plates).

Position 3: Station Drop. While the bird is still clamped, the bird and clamp mechanism move down to a different height, readying it for the clipping of Position 4 (FIG. 5). The machine can rotate to Position 4 after the station 14 moves into the lower position.

Position 4: Clipper Station. This position allows for insertion into the clipper 25c. Before or after it is in the clipper 25c, the bag tail is gathered, a clip is applied, the knife fires, cutting the bag tail loose from the packaged bird, and the tail is removed by a blower or a vacuum system, or the like. For example, a vacuum block can pull a vacuum on the bag tail and help gather the bag tail, then pulling excess cut tail away after cutting. A mechanical device can pull the upper portion of the bag to provide a more uniform rope diameter of the bag. Different mechanical devices can be used depending on the clipper type, e.g., single gate or double gate. The system 10 indexes another time. During the rotation from position 4 to position 5, the packaged bird can be released, typically dropping or placing it on a takeaway conveyor (which may be supplied by the customer). Manual or other automated removal may be used.

Position 5: Bag Loading Station. The bag loading station can be a dual station 35L with 180 degree rotational setup. Bags 40 (e.g., connected lengths of bags) can be loaded on one side of the dual bag station while the system 10 is running in normal operation mode, using the other side of the dual bag station. The dual bag station, where used, will rotate the recently loaded side into position for use and the empty side into position for reloading. Once the station is rotated, the machine will continue with normal operation. More bags can be refilled while the machine is running, readying the dual bag station for another rotation.

The machine then indexes once more to complete the revolution (e.g., a single rotation of the endless travel path). While indexing from Position 5 to Position 1, the side-to-side and/or front-to-back clamps 23c lift back up the distance the clamps 23c of the respective holding station 14 dropped in position 3. Once the "empty" holding station 14 arrives at Position 1, the system 10 is ready for another bird.

The systems 10 can accept user input to select the desired product and the system can automatically electronically implement different parameters such as different drive speeds, table position, input device speed, desired clipper activation speed, holding station drop and raising speed and/or drop distance and the like.

The system 10 can be Ethernet ready for remote access via VPN and may also be PROFIBUS ready, foreign language supported. FIGS. 23A-23D illustrate a top box 510 which houses a circuit that operates using an Ethernet signal to provide the Internet interface and to communicate with (e.g., controls) valves associated with the system 10. The box 510 may reside over a rotary union box 505 with airlines to pneumatic components of the system 10. A larger box 500 can house the valves associated with the operation of the drive and station actuators. The box 500 can rotate with the center column. The Ethernet and rotary union boxes may be static (non-rotational).

In some embodiments, the system 10 can be configured to operate with an automated synchronized drive control system that may use a single virtual axis for ramp-up to maximum operational speed drive system can operate at a selected (variable or constant) speed.

The system 10 can be configured with an automatic positioning using a touchscreen input on the HMI (human/machine interface) display.

Figure 29:
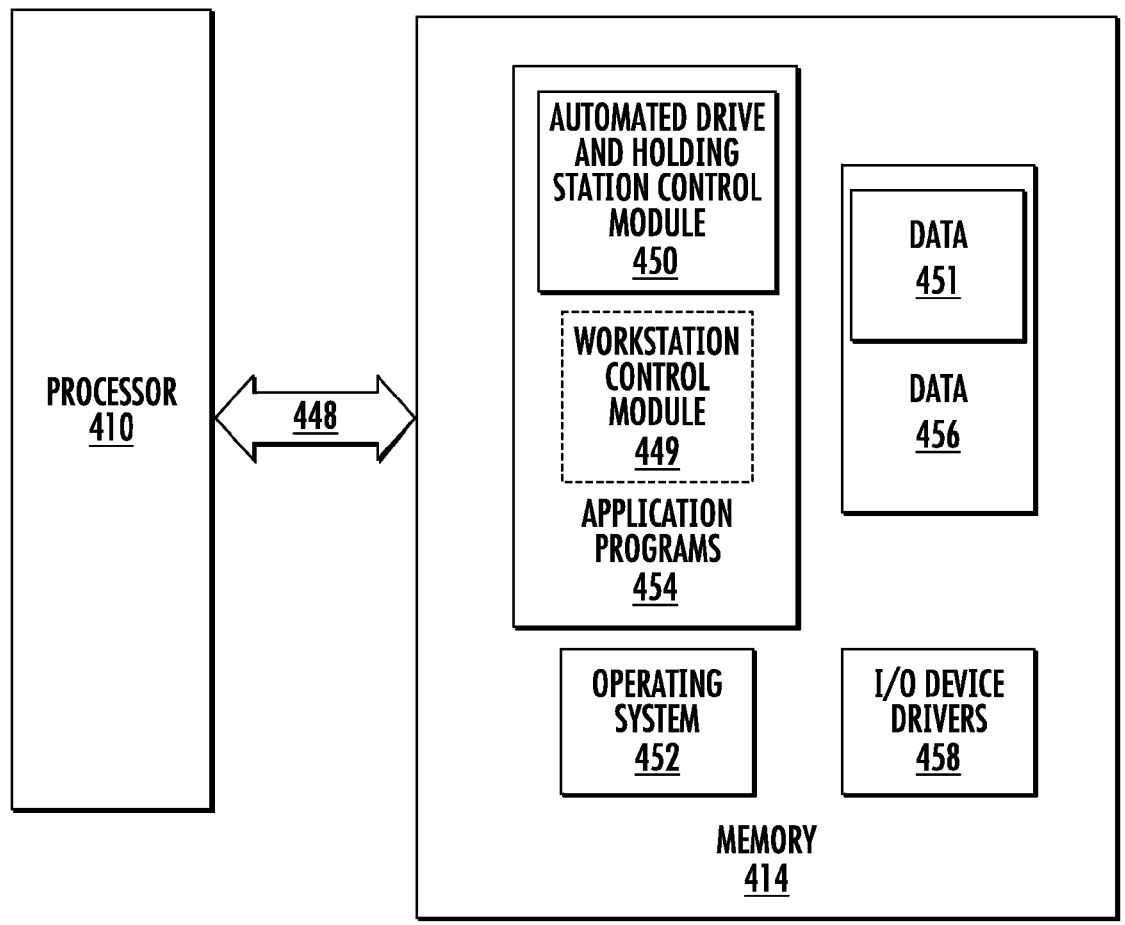
FIG. 29 is a block diagram of a data processing system according to embodiments of the present invention.

FIG. 29 is a block diagram of exemplary embodiments of data processing systems that illustrates systems, methods, and computer program products in accordance with embodiments of the present invention. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIG. 29, the memory 414 may include several categories of software and data used in the data processing system 405: the operating system 452; the application programs 454; the input/output (I/O) device drivers 458; the Automated Control and Holding Station Drive Module 450 and/or Workstation Control Module 449; and the data 456.

The data 456 may include synch adjustments, drive speeds, clipper set-up information, and the like, corresponding to particular or target products or input parameters for one or more producers. The data 456 may include a synchronized drive module for synchronizing the drive speeds of the different cooperating systems, e.g., holding support (column) drive system and the like.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components and/or the dispensing system 420. The application programs 454 are illustrative of the programs that implement the various features of the data processing system 405 and preferably include at least one application which supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the Modules 449, 450 being an application program in FIG. 29, as will be appreciated by those of skill in the art, other configurations may also be utilized while still benefiting from the teachings of the present invention. For example, the Modules 449, 450 may also be incorporated into the operating system 452, the I/O device drivers 458 or other such logical division of the data processing system 405. Thus, the present invention should not be construed as limited to the configuration of FIG. 29, which is intended to encompass any configuration capable of carrying out the operations described herein.

The I/O data port can be used to transfer information between the data processing system 405 and the downstream clippers or another computer system or a network (e.g., the Internet and/or Ethernet) or to other devices controlled by the processor. These components may be conventional components such as those used in many conventional data processing systems which may be configured in accordance with the present invention to operate as described herein.

While the present invention is illustrated, for example, with reference to particular divisions of programs, functions and memories, the present invention should not be construed as limited to such logical divisions. Thus, the present invention should not be construed as limited to the configuration of FIG. 29 but is intended to encompass any configuration capable of carrying out the operations described herein.

The operation and sequence of events and can be controlled by a programmable logic controller (PLC). The operational mode and certain input parameters or machine controls can be selected or controlled by an operator input using a Human Machine Interface (HMI) to communicate with the controller as is well known to those of skill in the art.

The block diagram illustrates the architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An automated bagging packaging system comprising:
   a plurality of spaced apart product holding stations spaced apart about an endless travel path; and
   a plurality of spaced apart workstations, including at least one clipper workstation, positioned about the endless travel path, wherein, in operation, at least one of the holding stations or the workstations translate about the endless travel path so that a respective holding station serially cooperates with each of the plurality of different workstations,
   wherein the system comprises a center column, wherein each holding station comprises a clamp mechanism with a pair of spaced apart clamps, and wherein the clamp mechanism is supported by the center column, wherein the clipper workstation has a clipper with a gate, and wherein the clipper gate is open to receive an upper end portion of a bag and automatically closes to gather the upper end portion of the bag before the clipper applies at least one clip to the gathered portion of the bag.

2. The system of claim 1, wherein the product holding stations are configured to travel substantially in concert about the endless travel path, wherein the column supports the holding stations and has a drive system that rotates the holding stations about the endless travel path.

3. The system of claim 1, further comprising a first loading workstation and a second hocking workstation residing upstream of the clipper workstation with the clipper workstation defining a third workstation, wherein the first, second and third workstations are substantially circumferentially spaced apart along the endless travel path.

4. The system of claim 3, further comprising a discharge location residing circumferentially spaced apart and downstream from the third workstation, and a bag loading station residing circumferentially spaced apart and between the clipper workstation and the loading workstation.

5. The system of claim 3, wherein each holding station comprises a clamp mechanism that is pivotably attached to a linkage in communication with at least one actuator that automatically translates the clamp mechanism downward a defined distance between the hocking workstation and the clipper workstation.

6. The system of claim 1, wherein each holding station comprises a pair of outwardly extending arms that are supported by the column and that rotate and support a pair of downwardly extending spaced apart horn members on an outer end portion thereof, wherein the horn members are configured to reside inside a bag with an open end of the bag facing upward, and wherein the holding stations are poultry holding stations configured such that each holds a bird with legs facing upward in the bag.

7. The system of claim 1, wherein the column has a vertically extending centerline, and wherein the plurality of spaced apart holding stations is between about 5 and 8 holding stations, and wherein the holding stations rotate in concert to index defined distances about the column centerline.

8. The system of claim 1, further comprising at least one drive system in communication with the column supporting the holding stations that is configured to rotatably translate the holding stations in concert a defined distance, then pause or stop the holding stations for a defined time, before again translating the holding stations in concert the defined distance to thereby automatically index the holding stations through a desired workstation progression about the endless travel path.

9. The system of claim 1, wherein each holding station comprises a clamp mechanism that has a pair of clamps that are transversely spaced apart and face each other across opposing sides of the bag, and wherein the clamp mechanism is pivotably attached to a linkage that is attached to a frame of the system to be able to rotate about the endless travel path, the linkage also being in communication with an actuator that automatically translates the clamp mechanism downward a defined distance between the hocking workstation and the clipper workstation.

10. The system of claim 1, wherein the clamp mechanisms comprise at least one back plate and fingers, and wherein respective at least one back plates and fingers are configured to travel substantially in concert between open and closed positions.

11. The system of claim 1, wherein the horn members have a funnel shaped upper portion that merge into elongate lower portions that extend a distance into a respective bag at a product loading station and a hocking workstation.

12. The system of claim 11, wherein the horn members have an upper portion that when spaced apart stretch the bag open to define a substantially oval shape at an upper portion of the bag, and wherein the horn members have elongate concave lower portions that reside in the bag and face each other across an open space of the bag.

13. The system of claim 11, wherein the horn members, when viewed from a top, have a substantially "C" shape at an upper portion thereof, and wherein, in a closely spaced position, an inner leg of one C-shaped horn member resides inside an outer leg of the other one of the "C"-shaped horn member.

14. The system of claim 1, wherein the system comprises a bag loading station that resides between a product loading station and the clipper workstation, wherein the bag loading station comprises a wicketed set of bags with at least one angled or off-center slit that extends at an upper portion thereof.

15. The system of claim 1, wherein the holding stations comprise a spring-loaded plate, wherein one of the workstations is a hocking workstation that comprises a pusher block that automatically translates down to enter an open end of the bag and push against the poultry therein down against the spring-loaded plate to cooperate with a clamp mechanism on-board the holding station and the spring-loaded plate to hock the legs thereof while the poultry is held upwardly in the bag.

16. The system of claim 1, wherein one of the workstations is a product loading station, and wherein the holding stations have a clamp mechanism with spaced apart front-to-back or side-to-side oriented cooperating clamp members, and a pair of horn members that cooperate to hold the bag open, wherein, the horn members can move laterally relative to each other, and wherein, in operation, at the product loading station the horn members are spaced apart a distance inside a respective upper end portion of a bag to hold the bag stretched open while a single whole bird is placed in the opened bag.

17. The system of claim 1, further comprising:
(a) a drive system that automatically rotates the holding stations about the center column to serially present the holding stations to different workstations about the travel path; and
(b) a controller in communication with the drive system to electronically adjust a speed of rotation.

18. The system of claim 1, wherein the workstations include the clipper workstation, a hocking workstation and a whole-bird loading workstation, the system further comprising an automated drive system with a controller that is configured to automatically index the holding stations to different positions along the travel path during operation whereby between about 20-50 birds per minute are automatically packaged in clipped bags.

19. The system of claim 1, wherein the product holding stations each comprise cooperating laterally translatable horn members that laterally extend and retract while inside a respective bag and that are attached to a frame of the packaging system to be able to rotate about the endless travel path.

20. An automated bagging packaging system comprising:
a plurality of spaced apart product holding stations spaced apart about an endless travel path; and
a plurality of spaced apart workstations, including at least one clipper workstation, positioned about the endless travel path, wherein, in operation, at least one of the holding stations or the workstations translate about the endless travel path so that a respective holding station serially cooperates with each of the plurality of different workstations,
wherein each holding station comprises a clamp mechanism that is defined by a pair of cooperating back plates and a pair of cooperating fingers residing in front of the back plates defining a poultry holding region therebetween, and wherein the fingers and back plates snugly hold the poultry held in a bag' therebetween so that legs of the poultry are held in a hocked position as a respective holding station translates about at least a portion of the endless travel path.

21. An automated bagging packaging system comprising:
a plurality of spaced apart product holding stations spaced apart about an endless travel path; and
a plurality of spaced apart workstations, including at least one clipper workstation, positioned about the endless travel path, wherein, in operation, at least one of the holding stations or the workstations translate about the endless travel path so that a respective holding station serially cooperates with each of the plurality of different workstations,
wherein each holding station comprises a clamp mechanism that is pivotably attached to a linkage in communication with at least one actuator that automatically translates the clamp mechanism downward a defined distance between the hocking workstation and the clipper workstation, and
wherein the clamp mechanism is configured to translate upward the defined distance between the bag loading workstation and the product loading workstation.

22. An automated bagging packaging system comprising:
a plurality of spaced apart product holding stations spaced apart about an endless travel path; and a plurality of spaced apart workstations, including at least one clipper workstation, positioned about the endless travel path, wherein, in operation, at least one of the holding stations or the workstations translate about the endless travel path so that a respective holding station serially cooperates with each of the plurality of different workstations, wherein the product holding stations are configured to travel substantially in concert about the endless travel path, the system further comprising at least one upstanding column that supports the holding stations and has a drive system that rotates the holding stations about the endless travel path, wherein the system resides proximate a moving suspended shackle system, and wherein, at the product loading workstation, each holding station is configured to serially receive a whole bird held by the shackle system and automatically position the received whole bird inside a bag held by the holding station with legs of the bird facing upward toward an open end of the bag.

23. An automated product bagging system, comprising:
a plurality of spaced apart product holder stations that index to serially stop at a plurality of defined locations about a continuous travel path; and
a plurality of spaced apart automated workstations positioned along the travel path that serially cooperate with a respective product holder station to automatically carry out defined operations, wherein one of the automated workstations is a clipping workstation that automatically applies at least one clip to a gathered tail portion of a covering holding a respective product,
wherein the clipper workstation has a clipper with a gate, and wherein the clipper gate is open to receive an upper end portion of a bag and automatically closes to gather the upper end portion of the bag before the clipper applies at least one clip to the gathered portion of the bag.

24. The system of claim 23, wherein the plurality of holder stations is between about 4-12.

25. The system of claim 23, further comprising a central upstanding column that holds each of the product holder stations, wherein the travel path is substantially circular such that the product holders rotate about an axially extending centerline of the column.

26. The system of claim 23, wherein the product holder stations are whole-bird holder stations that hold respective birds with legs facing outward and upward in a bag.

27. The system of claim 23, wherein the workstations include a hocking workstation residing proximate an outer perimeter of the travel path upstream of the clipper workstation.

28. The system of claim 23, wherein each product holder station further comprises a horn assembly with a pair of horn members that travel laterally to snugly hold a top portion of a flexible bag.

29. The system of claim 28, wherein the pair of horn members are configured to stretch the bag to form a substantially oval shape at an upper portion thereof.

30. The system of claim 23, wherein the holding stations include clamps that are configured to reside under a top of the bag in a clamped configuration through the hocking and clipper workstations and that are rotatably attached to a floor supported frame of the system, and wherein the clamps extend against hocked legs, side to side and/or front to back below the top of the bag without requiring the clamps to close the top of the bag to move the bag to the clipper.

31. An automated product bagging system, comprising:
a plurality of spaced apart product holder stations that index to serially stop at a plurality of defined locations about a continuous travel path; and
a plurality of spaced apart automated workstations positioned along the travel path that serially cooperate with a respective product holder station to automatically carry out defined operations, wherein one of the automated workstations is a clipping workstation that automatically applies at least one clip to a gathered tail portion of a covering holding a respective product,
wherein each product holder station further comprises a clamp mechanism that is configured to clamp against a bird held in a bag and automatically (a) translate downward a distance of between about 6-18 inches to reside at a lower level upstream of the clipper workstation, (b) keep the clamp mechanisms at the lower level through a bag loading workstation, then (c) automatically raise the clamp mechanism upward a distance to a product loading level between the bag loading workstation and a poultry loading workstation.

* * * * *

UNITED STATES PATENT AND TRADEMARK OFFICE
CERTIFICATE OF CORRECTION

| | | |
|---|---|---|
| PATENT NO. | : 9,010,072 B2 | Page 1 of 1 |
| APPLICATION NO. | : 13/071831 | |
| DATED | : April 21, 2015 | |
| INVENTOR(S) | : May et al. | |

It is certified that error appears in the above-identified patent and that said Letters Patent is hereby corrected as shown below:

In the Claims:
Column 24, Claim 20, Line 42: Please correct "bag'therebetween"
         to read -- bag therebetween --

Signed and Sealed this
Nineteenth Day of January, 2016

Michelle K. Lee
*Director of the United States Patent and Trademark Office*